(12) United States Patent
Naono et al.

(10) Patent No.: US 10,412,455 B2
(45) Date of Patent: Sep. 10, 2019

(54) IMAGE MANAGEMENT DEVICE

(71) Applicant: Ripplex Inc., Tokyo (JP)

(72) Inventors: Norihiko Naono, Tokyo (JP); Kunihiko Ohnaka, Tokyo (JP); Jumpei Yamamoto, Tokyo (JP)

(73) Assignee: RIPPLEX INC., Tokyo (JP)

( * ) Notice: Subject to any disclaimer, the term of this patent is extended or adjusted under 35 U.S.C. 154(b) by 31 days.

(21) Appl. No.: 15/628,234

(22) Filed: Jun. 20, 2017

(65) Prior Publication Data

US 2017/0289630 A1    Oct. 5, 2017

Related U.S. Application Data

(63) Continuation of application No. 14/048,202, filed on Oct. 8, 2013, now Pat. No. 9,712,876, which is a continuation of application No. PCT/JP2011/058866, filed on Apr. 8, 2011.

(51) Int. Cl.
*H04N 21/472* (2011.01)
*H04N 21/418* (2011.01)
(Continued)

(52) U.S. Cl.
CPC ....... *H04N 21/472* (2013.01); *H04N 21/4182* (2013.01); *H04N 21/4184* (2013.01);
(Continued)

(58) Field of Classification Search
CPC .............. H04N 21/472; H04N 21/632; H04N 21/8352; H04N 21/8153; H04N 21/4223;
(Continued)

(56) References Cited

U.S. PATENT DOCUMENTS 6,967,675 B1    11/2005    Ito et al.
2004/0070678 A1    4/2004    Toyama et al.
(Continued)

FOREIGN PATENT DOCUMENTS

JP    2002-209131 A    7/2002
JP    2003-069935 A    3/2003
(Continued)

OTHER PUBLICATIONS

Japanese Office Action dated Oct. 13, 2015 for a corresponding Japanese Application No. 2013-508692.
(Continued)

*Primary Examiner* — Timothy J Henn
(74) *Attorney, Agent, or Firm* — Holtz, Holtz & Volek PC

(57) ABSTRACT

As an embodiment of the present invention, there is provided an information terminal comprising: an input/output part for performing input and output with respect to an image storage device for storing image information captured by an imaging terminal; a storage part for associating and storing image identification information for identifying the image information, summary image information that includes less information than the image information, and device identification information for identifying the image storage device; and a display part; wherein the device identification information stored in the storage part is displayed by the display part, the summary image information that is associated with device identification information selected from the device identification information displayed by the display part is displayed by the display part, and the image information associated with the summary image information selected from the summary image information displayed by the display part is displayed by the display part.

5 Claims, 32 Drawing Sheets

(51) Int. Cl.
*H04N 21/433* (2011.01)
*H04N 21/4223* (2011.01)
*H04N 21/81* (2011.01)
*H04N 21/8352* (2011.01)
*H04N 21/63* (2011.01)

(52) U.S. Cl.
CPC ..... *H04N 21/4223* (2013.01); *H04N 21/4332* (2013.01); *H04N 21/4334* (2013.01); *H04N 21/632* (2013.01); *H04N 21/8153* (2013.01); *H04N 21/8352* (2013.01)

(58) Field of Classification Search
CPC ........... H04N 21/4182; H04N 21/4184; H04N 21/4334; H04N 21/4332
See application file for complete search history.

(56) References Cited

U.S. PATENT DOCUMENTS

2006/0055791 A1   3/2006  Morino
2014/0047491 A1*  2/2014  Naono ............... H04N 21/4184
                                          725/110

FOREIGN PATENT DOCUMENTS

| JP | 2003-244601 A | 8/2003 |
|---|---|---|
| JP | 2003-283900 A | 10/2003 |
| JP | 2004-341630 A | 12/2004 |
| JP | 3664203 B2 | 4/2005 |
| JP | 2006-268295 A | 10/2006 |
| JP | 2007-072727 A | 3/2007 |
| JP | 2007-094640 A | 4/2007 |
| JP | 4251757 B2 | 1/2009 |
| JP | 2010-178360 A | 8/2010 |

OTHER PUBLICATIONS

Japanese Office Action dated Jul. 14, 2015 regarding a corresponding Japanese Patent Application No. 2013-508692.
International Search Report dated May 31, 2011 for PCT/JP2011/058866.
International Preliminary Report on Patentability dated Oct. 8, 2013 for PCT/JP2011/058866.

* cited by examiner

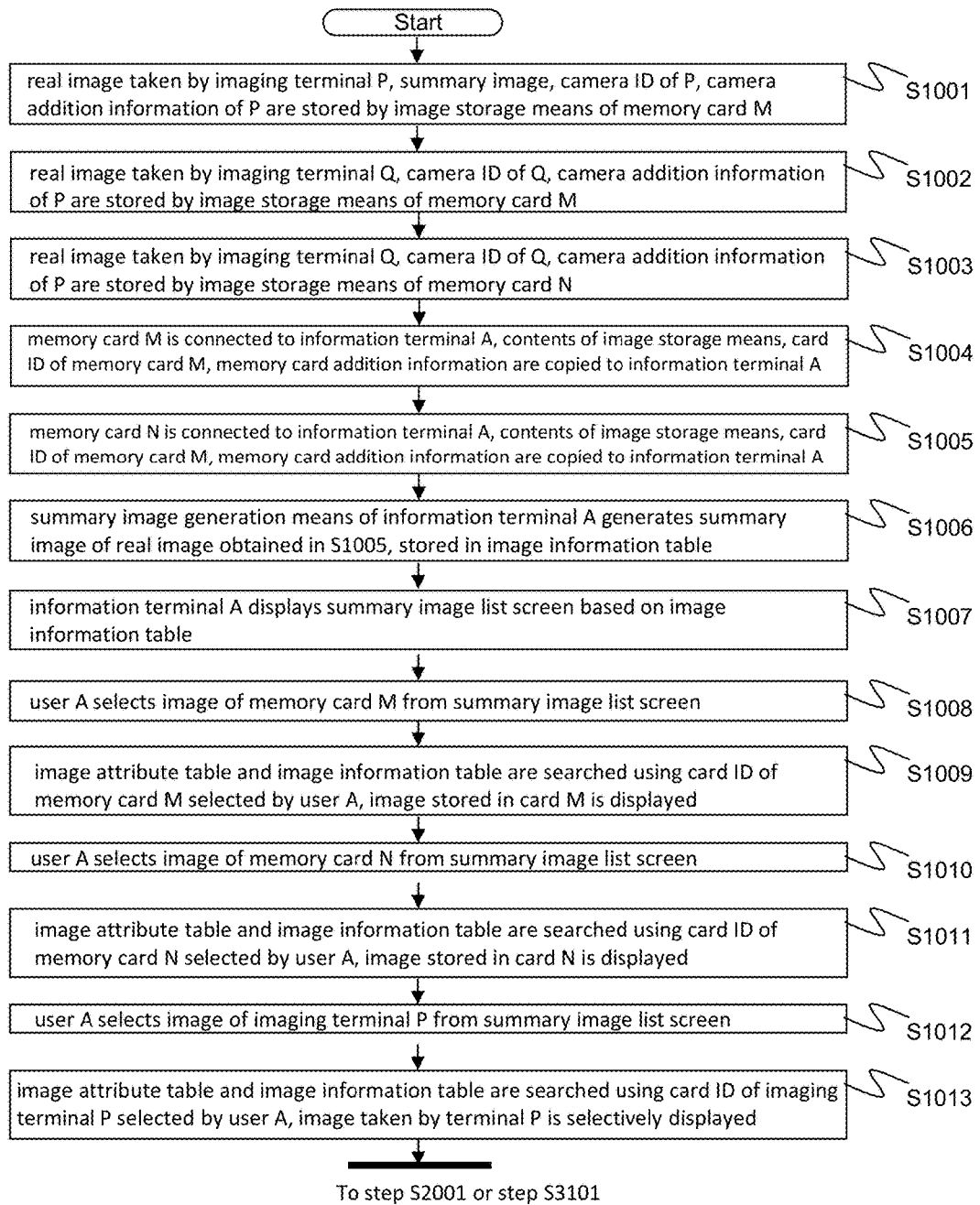

| real image ID | real image information | summary image ID | summary image information | camera ID | camera additional information |
|---|---|---|---|---|---|
| P001-org.jpg | ........ | P001-sum1.jpg | ........ | CIDp | camerap.jpg |
| P002-org.jpg | ........ | P002-sum1.jpg | ........ | CIPp | camerap.jpg |

(b)

| real image ID | real image information | summary image ID | summary image information | camera ID | camera additional information |
|---|---|---|---|---|---|
| P001-org.jpg | ........ | P001-sum1.jpg | ........ | CIDp | camerap.jpg |
| P002-org.jpg | ........ | P002-sum1.jpg | ........ | CIDp | camerap.jpg |
| IMG26-org.jpg | ........ | | | CIDq | cameraq.jpg |
| IMG27-org.jp | ........ | | | CIDq | cameraq.jpg |

Fig. 12

| real image ID | real image information | summary image ID | summary image information | camera ID | camera additional information |
|---|---|---|---|---|---|
| IMG322-org.jpg | ...... | | | CIDq | cameraq.jpg |
| IMG323-org.jpg | ...... | | | CIDq | cameraq.jpg |

Fig. 13

| real image ID | real image information | summary image ID | summary image information |
|---|---|---|---|
| P001-org.jpg | ...... | P001-sum1.jpg | ...... |
| P002-org.jpg | ...... | P002-sum1.jpg | ...... |
| IMG26-org.jpg | ...... | IMG26-sum1.jpg | ...... |
| IMG27-org.jp | ...... | IMG27-sum1.jp | ...... |
| IMG322-org.jpg | ...... | IMG322-sum1.jpg | ...... |
| IMG323-org.jpg | ...... | IMG323-sum1.jpg | ...... |

Fig. 14

| real image ID | camera ID | real storage destination |
|---|---|---|
| P001-org.jpg | CIDp | TIDa, MIDm |
| P002-org.jpg | CIDp | TIDa, MIDm |
| IMG26-org.jpg | CIDq | TIDa, MIDm |
| IMG27-org.jp | CIDq | TIDa, MIDn |
| IMG322-org.jpg | CIDq | TIDa, MIDn |
| IMG323-org.jpg | CIDq | TIDa, MIDn |

Fig. 20 (Embodiment 1)

Fig. 22

| Real image ID | Camera ID | Real storage destination |
|---|---|---|
| P001-org.jpg | CIDp | TIDa, MIDm, SIDx ~2213 |
| P002-org.jpg | CIDp | TIDa, MIDm |
| IMG26-org.jpg | CIDq | TIDa, MIDm, SIDx ~2233 |
| IMG27-org.jp | CIDq | TIDa, MIDm |
| IMG322-org.jpg | CIDq | TIDa, MIDn |
| IMG323-org.jpg | CIDq | TIDa, MIDn, SIDx ~2263 |

104

Fig. 26 (Embodiment 2)

Fig. 29

| card ID 2901 | transfer source terminal ID 2902 | transfer destination terminal ID 2903 |
|---|---|---|
| CIDn | TIDa | TIDb |
| ... | ... | ... |

162
2911
2912
2913

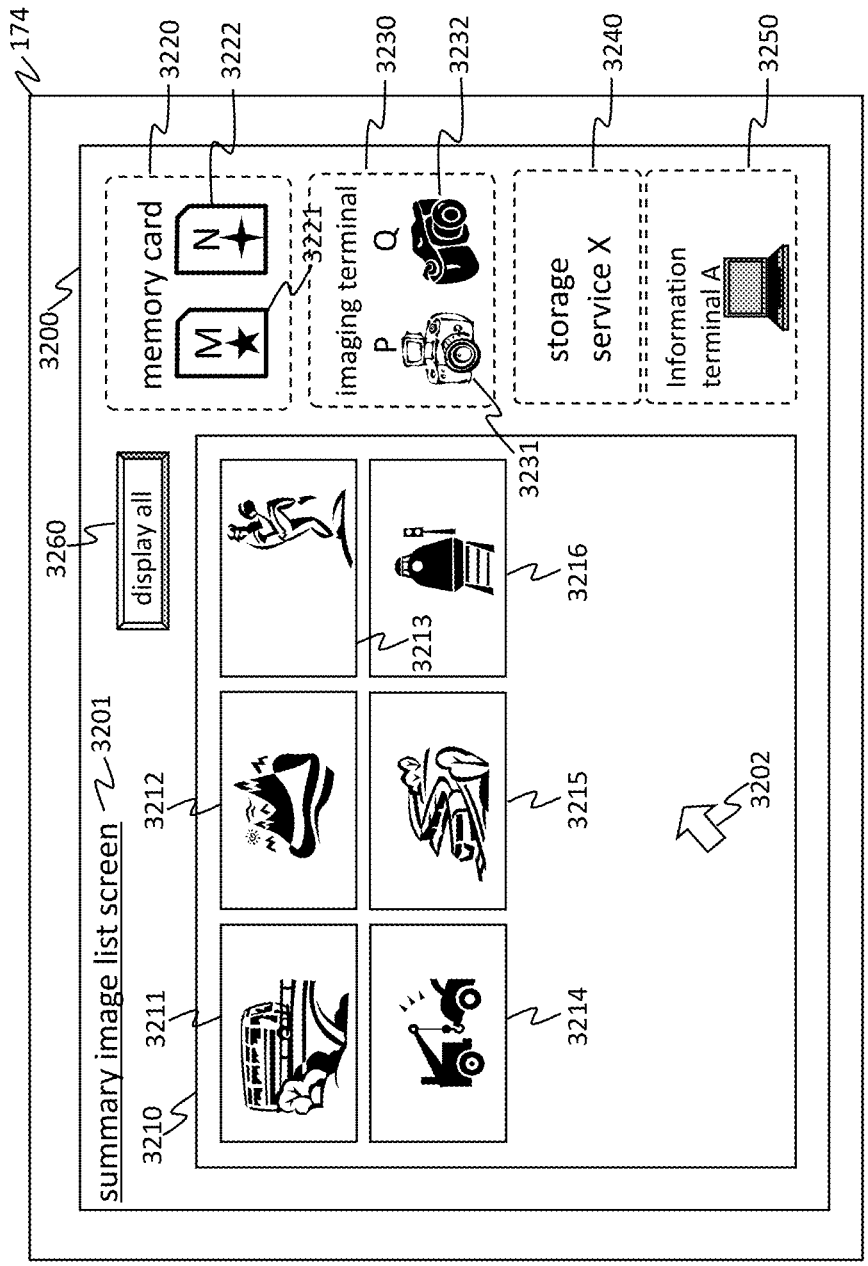

IMAGE MANAGEMENT DEVICE

CROSS-REFERENCE TO RELATED APPLICATION

The present application is a continuation of U.S. patent application Ser. No. 14/048,202 filed Oct. 8, 2013, which is a U.S. continuation application filed under 35 USC 111(a) claiming benefit under 35 USC 120 and 365(c) of PCT application JP2011/058866, filed on Apr. 8, 2011, the entire contents of which are incorporated herein by reference.

BACKGROUND OF THE INVENTION

Field of the Invention

The present invention is related to an information terminal, a memory card, an imaging terminal, a display terminal, a server, which are used to manage images, and a system arranged with the same.

Description of the Related Art

With the spread of digital cameras, the number of images taken by one user has increased dramatically compared with the period when silver halide film type cameras were mainstream. The reason for this is that the cost per photographed image is low. Furthermore, in recent years, with the miniaturization of semiconductor technology, the storage capacity of storage devices such as a flash memory used in digital cameras has increased which has led to an increase in the number of images taken. A camera user can now take a large amount of images without having to worry about the limits of storage capacity and cost, and by post-organization of the images, the user can select only high-quality images and discard the rest.

In addition, the type of imaging terminal used by a user is also diversified. One user often selectively uses a plurality of imaging terminals such as a single-lens reflex type camera to take high-resolution still images, a compact type camera which can be carried around at all times, and a video camera to take the video. In recent years, mobile information terminals other than cameras, for example, portable personal computers, cellular phones, and mobile music players have also been adapted to be mounted with the imaging devices. These mobile type information terminals are also being used as imaging devices. As described above, a situation in which one user carries a plurality imaging devices and takes a large number of images using each terminal has arisen.

Most of the image information taken by imaging devices is stored in a memory card connected to the imaging device. SD memory cards, CompactFlash (registered trademark), and USB memory are used as the memory cards. As a result, in the case where one user has a plurality of information terminals, that user has a plurality of memory cards and the image information taken using the plurality of terminals is stored in among the plurality of memory cards. Furthermore, in recent years, because the part price per capacity has dropped, when the volume of the image information reaches the storage capacity of the memory card connected to the imaging terminal, a new memory card must be connected to the imaging device and the old memory card is retained in order to keep the image information.

BRIEF SUMMARY OF THE INVENTION

As described above, the situation where one user uses a plurality of imaging terminals, takes a large amount of image information using each imaging terminal, stores the image information is across a plurality of memory cards, and further stores the memory cards is becoming common. Consequently, it is difficult for the user to maintain and manage the large amount of image information.

As a method for managing and maintaining a large amount of image information taken by a plurality of imaging terminals and stored in a plurality of memory cards, it is often the case that all or part of the image information is managed by copying to an information terminal such as a personal computer. However, in reality, because there is a limit to the capacity of the storage means in the information terminal it is not easy to store and manage all of the image information in the information terminal. In the case where the information terminal is connected to the Internet, a method exists to use a storage service via a network and copy the image information to an external server. However, by copying the image information to an information terminal or storage service from a memory card in this manner, the same image information is distributed across memory cards, information terminal, and servers of a storage service and it becomes more difficult to manage the image information.

Maintenance and management of a large amount of image information taken by a plurality of imaging terminals and stored in a plurality of memory cards, information terminals or storage service over a network has the following five points which need to be solved.

The first is a problem that it is complicated to copy image information to an information terminal which performs maintenance and management of the image information from an imaging device. After a user takes an image, removes a memory card from the imaging terminal, and attaches it to an information terminal to perform maintenance and management of the images, the user copies this image information to the information terminal. A personal computer is often used as an information terminal that performs maintenance and management of images. For general users, an operation of copying a large amount of image information to a personal computer from a memory card is complicated.

The second is a problem that specifying a storage location for the photographed images is difficult. It is difficult for a user find a specific image previously taken which is stored in a particular memory card in a state in which the images taken with a plurality of imaging terminals is stored in a plurality of memory cards. Furthermore, in the case where a part of the image information stored in the memory card is copied to an information terminal such as a personal computer or a storage service via the Internet, it is difficult to specify which image is stored in which storage location. Despite a large amount of image information taken by a user being stored across a plurality of memory cards, information terminals, and servers of a storage service, this problem occurs because there is no method which manages the image information in a unified manner.

The third is a problem that is a backup is difficult. In addition to a user taking a large amount of images using a plurality of imaging terminals, in recent years, the amount of information per image has increased with improved performance of imaging elements. In particular, the amount of image information of a video is large. The total capacity of image information taken by a single user has increased significantly due to the synergistic effects of these. The total capacity of all images taken by a single user often exceeds a storage device such as a memory card or personal computer. As a result, in the case where the image information is backed up, the image information must be distributed across a plurality of memory cards, information terminals, and servers of storage services. However, this has made maintaining and managing image information even more difficult.

The fourth is a problem that it is difficult to browse image information on a plurality of display terminals and send the image information to other people. For example, in the case where a mobile phone is used as an imaging device, it is easy to send image information by email to other people, upload to a storage service via a network, or browse on a personal computer. However, for example, images to be sent to others or to be browsed on a different display terminal are sometimes taken with a single-lens reflex camera which does not include a network function, and stored in the card. In this case, in order to send images to other people or browser using another display terminal via a network, a user must first remove the memory card from the imaging device, attach to an information terminal such as a personal computer, copy the image information, and send the images via the network.

In order to omit these operations, directly connecting a camera or memory card to the Internet has been proposed (Japanese Patent No. 4251757, Japanese Patent No. 3664203, Japanese Laid Open Patent 2003-283900). Furthermore, a proposal for either storing image information in a memory card of an imaging terminal or selecting or setting a direct upload to a server on a network is disclosed (Japanese Laid Open Patent 2010-178360). However, although the operations required to copy using this method are reduced, the method does not contribute to solving the first to third problems described above. In fact, in some cases unified maintenance and management of all taken images by easily copying image information becomes more difficult.

The problem is a problem that because image information is stored across memory cards or information terminals, it is difficult to handle image information taken using a plurality of information terminals of via the Web. For example, because storage capacity in a mobile phone terminal is small, a user does not copy image information the user has taken on a device other than the mobile phone terminal to a mobile phone terminal but must request that they wish to browse via a Web browser. However, in a conventional method, because there is no method to manage which image information is stored in a particular memory card regardless of the ability to access the memory card on which the image information is stored via the internet, it is difficult for the user to handle images taken in a unified manner via the Web.

The present invention has been made in view of the circumstances described above by providing an information terminal which users can use even to maintain and manage image information that is stored in a memory card, an information terminal, or a server in a unified manner, a memory card, an imaging terminal, a display terminal, a mobile terminal, a server, a system and a method by using a card ID that uniquely identifies a memory card and a camera ID that uniquely identifies an imaging terminal on the internet.

A server is provided as one embodiment of the present invention including a network input and output part configured to connect via a network to a first information terminal and a second information terminal, the first information terminal being arranged with an input and output part configured to input and output with an image storage device configured to store image information taken by an imaging terminal; and a storage part configured to store image identification information for identifying image information, summary image information having a smaller amount of information than the image information, and device identification information for identifying the image storage device, the storage part being configured to correlate the image identification information, the summary image information, and the device identification information; wherein the network input and output part receives the image identification information, the summary image information, and the device identification information from the first information terminal; the storage part stores the image identification information, the summary image information, and the device identification information and correlates the image identification information, the summary image information, and the device identification information; the server sends the summary image information and the image identification information to the second information terminal; the server receives image identification information of summary image information, which is selected by the second information terminal; the server sends to the first information terminal the device identification information correlated with the image identification information, the device identification information being stored in the storage part; the server receives the image information from the image storage device via the first information terminal; and the server sends the image information to the second information terminal.

A memory card is provided as one embodiment of the present invention including an image storage part configured to store image information taken by an imaging terminal: and an input and output part configured to input and output with the imaging terminal and configured to input and output with an information terminal connectable to a network; wherein the input and output part receives image information from the imaging terminal; the image storage part stores the image information; and the input and output part sends to the information terminal memory card identification information for uniquely identifying the memory card within the network, the memory card identification information being correlated with image information of the external appearance of the memory card.

A memory card is provided as one embodiment of the present invention including an image storage part configured to store image information taken by an imaging terminal: and an input and output part configured to input and output with the imaging terminal and configured to input and output with an information terminal connectable to a network; wherein the input and output part receives image information from the imaging terminal; the image storage part stores the image information; and the input and output part sends to the information terminal the image information, the image information being correlated with memory card identification information for uniquely identifying the memory card within the network and image information identification information for identifying the image information.

A memory card is provided as one embodiment of the present invention including an image storage part configured to store image information taken by an imaging terminal and summary image information having a smaller amount of information than the image information and configured to correlate the image information and the summary image information; an input and output part configured to input and output with the imaging terminal and configured to input and output with an information terminal connectable to a network; wherein the input and output part receives the image information and summary image information from the imaging terminal; the image storage part stores the image information and the summary image information and correlates the image information and the summary image information with image information identification information for identifying the image information; and the input and output part sends to the information terminal the summary image information, the summary image information being correlated with the image information identification information, memory card identification information for uniquely identifying the memory card within the network, and image information of the external appearance of the memory card with summary image information.

A memory card is provided as one embodiment of the present invention including an image storage part configured to store image information taken by an imaging terminal; and an input and output part configured to input and output with the imaging terminal and configured to input and output with a first information terminal connectable to a network and a second information terminal connectable to the network; wherein the input and output part receives first image information from the imaging terminal; the image storage part stores the first image information; the input and output part sends to the first information terminal the first image information, the first image information being correlated with memory card identification information for uniquely identifying the memory card within the network and image information of an external appearance of the memory card; the input and output part sends to the second information terminal the memory card identification information, the input and output part being connected to the second information terminal; the input and output part receives a second image information with the memory card identification information as a key when the image information of the external appearance of the memory card is selected on a display of the first terminal and the second image information; and an image storage part stores the second image information, the second image information being received from the second information terminal.

An information terminal is provided as one embodiment of the present invention including an input and output part configured to input and output with an image storage device configured to store image information taken by an imaging terminal; a storage part configured to store image identification information for identifying the image information, summary image information having a smaller amount of information than the image information, and device identification information for identifying the image storage device, the storage part being configured to correlates the image identification information, the summary image information, and the device identification information; and a display part; wherein the information terminal displays the device identification information stored in the storage part in the display part; the information terminal displays summary image information in the display part, the summary image information being correlated with device identification information, which is selected from among the device identification information displayed in the display part; and the information terminal displays image information in the display part, the image information being correlated with summary image information selected from among the summary image information displayed in the display part.

A system is provided as one embodiment of the present invention including a first information terminal; a second information terminal; and a server; wherein the first information terminal includes: an input and output part configured to input and output with an image storage device configured to store image information taken by an imaging terminal; a storage part configured to store image identification information for identifying the image information, summary image information having a smaller amount of information than the image information, and device identification information for identifying the image storage device and configured to correlate the image identification information, the summary image information, and the device identification information; a network input and output part configured to communicate with the server via a network; and a display part the second terminal includes: an input and output part configured to input and output with the image storage device; and a network input and output part configured to communicate with the server; the server includes: a network input and output part configured to communicate with each of the first information terminal and the second information terminal; and a storage part; wherein the display part of the first information terminal displays device identification information; the display part of the first information terminal displays summary image information; the network input and output part of the first information terminal sends image information correlated with summary image information selected from the summary image information display in the display party of the first information terminal, and device identification information displayed to the server; the network input and output part of the server receives image information and device identification information from the first information terminal; the storage part of the server correlates stores the image information and the device identification information received by the network sending and receiving part of the server, and correlates the image information and the device identification information; the input and output part of the second information terminal obtains device identification information of the image storage device; the network input and output part of the second information terminal sends the device identification information obtained by the input and output part of the second information terminal; the network input and output part of the server receives device identification information from the second information terminal and sends the image information stored and correlated with the received device identification information to the second information terminal; the network input and output part of the second information terminal receives the image information from the server; and the input and output part of the second information terminal stores the image information received from the server in the image storage device.

A system is provided as one embodiment of the present invention including an information terminal; a mobile information terminal; a first server; and a second server; wherein the information terminal includes: a first input and output part configured to input and output with an image storage device storing image information taken by an imaging terminal; a storage part configured to store image identification information for identifying image information, summary image information having a smaller amount of information than the image information, and device identification information for identifying the image storage device and configured to correlate the image identification information, the summary image information, and the device identification information; and a network input and output part configured to communicate with the server; the first server and second server respectively include: a network input and output part configured to communicate with the information terminal and the mobile information terminal; and a storage part, the network input and output part of information terminal sends image identification information, summary image information, and device identification information stored in the storage part of the information terminal; the network input and output part of the first server receives the image identification information, the summary image information, and the device identification information sent from the information terminal; the storage part of the first server stores the image identification information, the summary image information, and the device identification information received by the network input and output part of the server; the network input and output part of the information terminal sends image information and image identification information stored in the image storage device; the network input and output part of the second server receives image information and image identification information from the information terminal; the storage part of the second server stores the image information and image identification information received from the network input and output part of the second server; the network input and output part of the first server receives device identification information sent from the mobile terminal; the network input and output part of the first server sends to the mobile terminal summary image information and image identification information stored and correlated with the received device identification information; the network input and output part of the second server receives the image identification information sent from the mobile terminal; and the network input and output part of the second server sends to the mobile terminal the image information stored and correlated with the received image identification information.

BRIEF EXPLANATION OF THE DRAWINGS

FIG. 10 is a flowchart of processes related to an embodiment of the present invention;

FIG. 11 is a diagram of one example of information stored by a memory card related to an embodiment of the present invention;

FIG. 12 is a diagram of one example of information stored by a memory card related to an embodiment of the present invention;

FIG. 13 is a diagram of one example of information stored by an image information table related to an embodiment of the present invention;

FIG. 14 is a diagram of one example of information stored by an image attribute table related to an embodiment of the present invention;

FIG. 22 is a diagram of one example of information stored by an image attribute table related to an embodiment of the present invention;

FIG. 29 is a diagram of one example of a card ID table of a server related to an embodiment of the present invention;

FIG. 32 is a diagram of one example of a Web request image list screen related to an embodiment of the present invention.

DETAILED DESCRIPTION OF THE INVENTION

The presently best and contemplated embodiments for carrying out the present invention are described below. The scope of the present invention is clearly defined by the scope of the appended claims and the description below should not be interpreted in a limiting sense and intends to simply exemplify the general principles of the invention.

Figure 1:
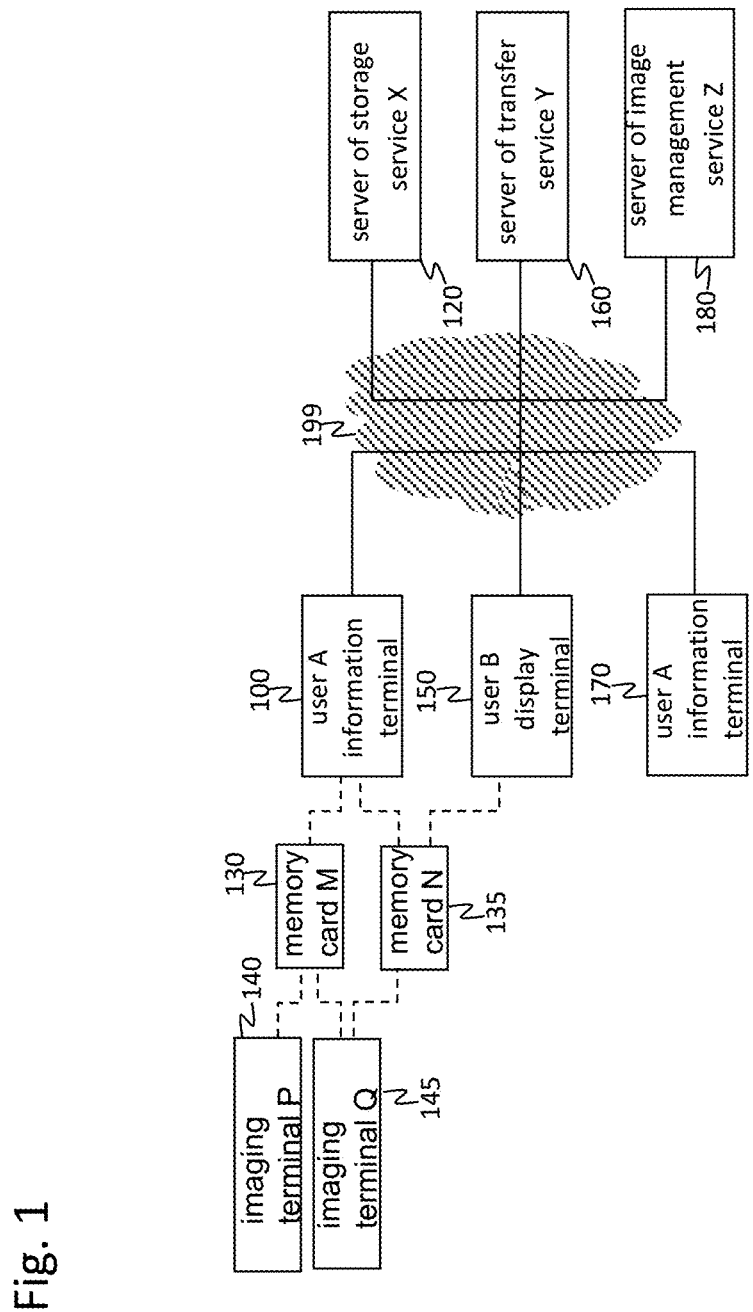
FIG. 1 is a schematic structural diagram of an image processing system related to an embodiment of the present invention.

FIG. 1 is a schematic structural diagram of an image processing system, which is an example of an embodiment of the present invention. The image information processing system which is an example of an embodiment of the present invention is formed by an information terminal 100 of a user A, a server 120 of a storage service X, a memory card M130, a memory card N135, an imaging terminal P140, an imaging terminal Q145, a display terminal of a user B 150, a server 160 of a transfer service Y, a server 180 of a mobile terminal 170 of the user A, and an image management service Z. The information terminal 100 of the user A, the server 120 of the storage service X, the display terminal 150 of the user B, the server 160 of the transfer service Y, and the server 180 of the mobile terminal 170 of the user A and the image management service Z are connected via a network 199. In addition, after the user A takes images in a state in which the imaging terminal P140 is connected to the memory card M130, the user A attaches the memory card M130 to the information terminal 100. Similarly, after the user A takes images in a state in which the imaging terminal Q145 is attached to the memory card M130, the user A connects the memory card M130 to the information terminal 100. After the memory card N135 is attached to the information terminal 100 of user A, the memory card N135 is attached to the display terminal 150 of the user B. In FIG. 1, the dotted line represents that attaching and removal occur in the processing in the present embodiment. That is, a memory card can be attached to an information terminal and an imaging device.

Furthermore, it should be noted that in the specification and attached drawings below, the server 120 of the storage service X may be abbreviated to the server X, the server 160 of the transfer service Y to the server Y, and the server 180 of the image management service Z to the server Z. In addition, the information terminal 100 of the user A may be abbreviated to the information terminal A, the display terminal of the user B to the display terminal B, and the mobile terminal of the user A to the mobile terminal B. In addition, the image information in an embodiment of the present invention may be a still or video image. An information terminal may be a mobile information terminal, a mobile phone terminal, music player, a camera, or a game consoles in addition to a personal computer. A display terminal may be any terminal with a display means such as a photo frame terminal, a television, a personal computer, a music player, a camera, a mobile phone terminal, a mobile information terminal, or a game console. A mobile terminal may be any mobile type information processing terminal such as a mobile phone terminal, a mobile information terminal, a music player, or a game console.

Figure 2:
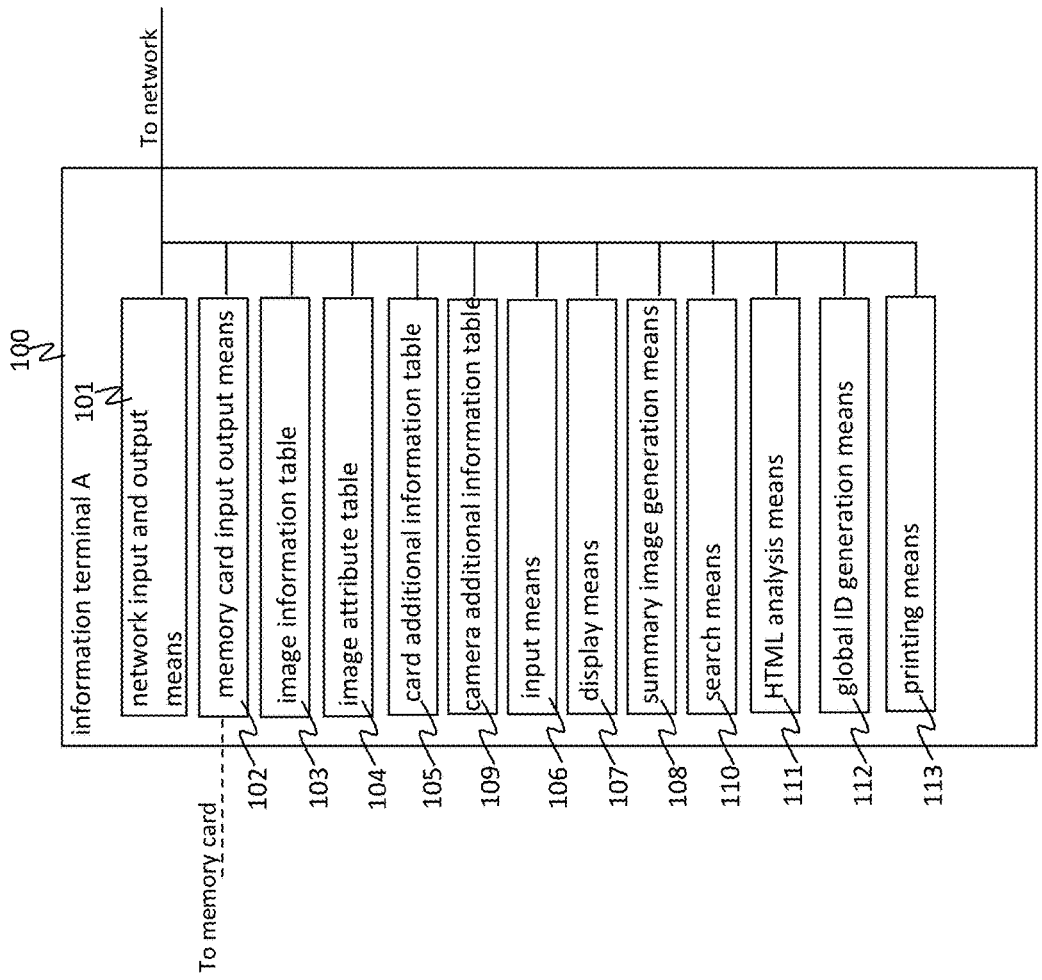
FIG. 2 is a schematic structural diagram of an information terminal related to an embodiment of the present invention.

FIG. 2 is an example of a schematic structural diagram of the information terminal 100. The information terminal 100 includes a network input and output means 101, a memory card input and output means 102, an image information table 103, an image attribute table 104, a card additional information table 105, a camera additional information table 109, an input means 106, a display means 107, a summary image generation means 108, a search means 110, an HTML analysis means 111, a global ID generation means 112, and a printing means 113.

Figure 3:
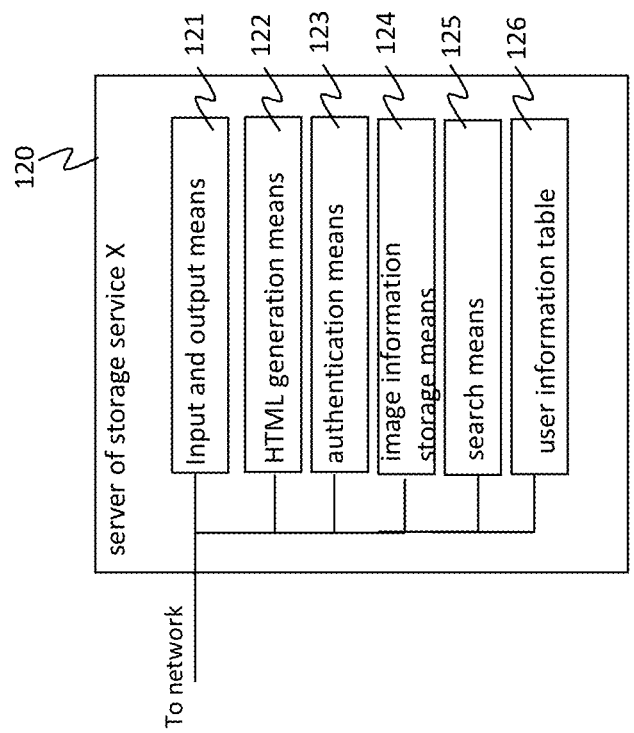
FIG. 3 is a schematic structural diagram of a server related to an embodiment of the present invention.

FIG. 3 is an example of a schematic structural diagram of the server X120. The server X120 includes an input and output means 121, an HTML generation means 122, an authentication means 123, an image information storage means 124, a search means 125, and a user information table 126.

Figure 4:
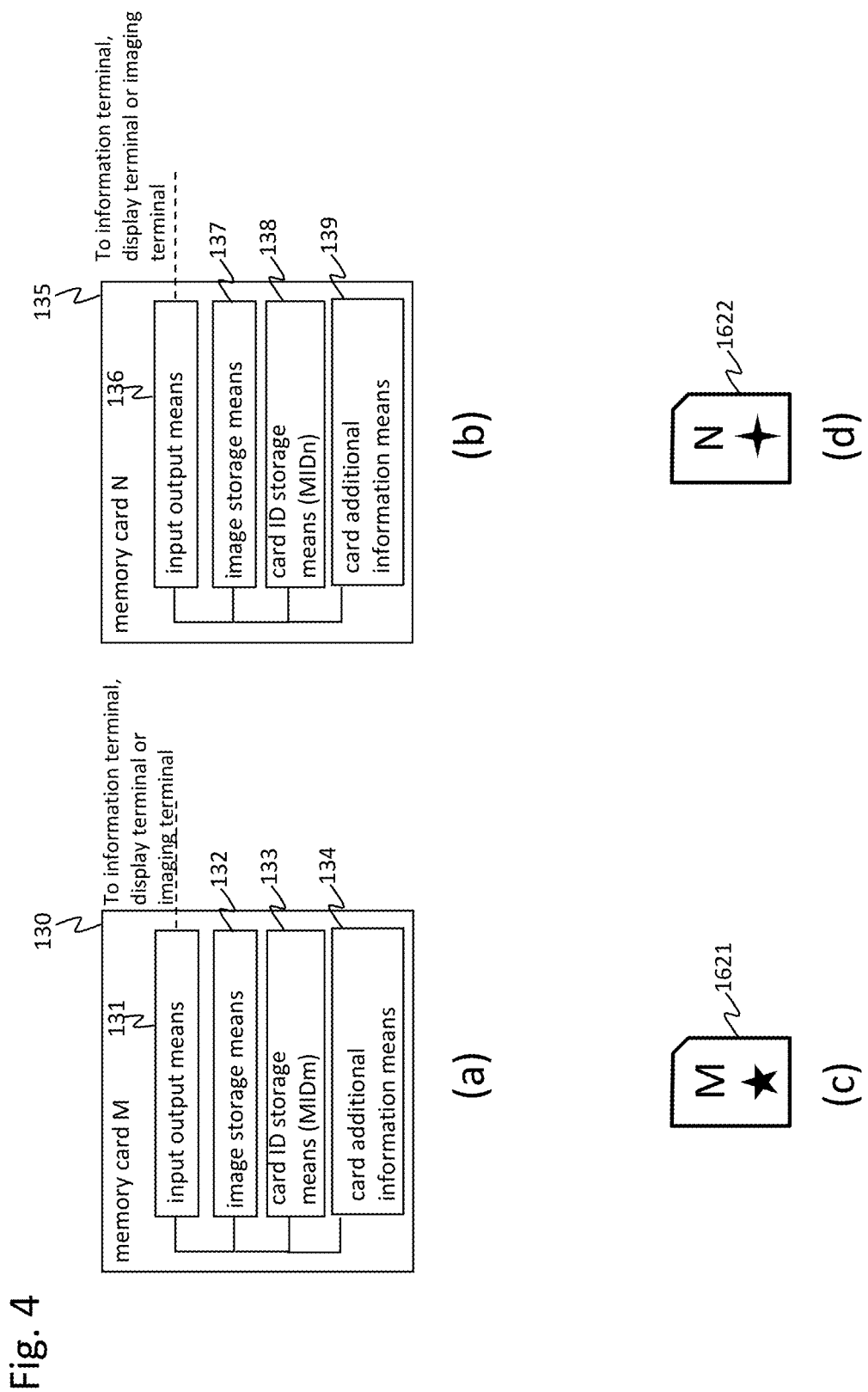
FIG. 4 is a schematic structural diagram of a memory card related to an embodiment of the present invention.

FIG. 4(a) is an example of a schematic structural diagram of the memory card M130. The memory card M130 includes an input and output means 131, an image storage means 132, a card ID storage means 133, and a card additional information storage means 134. A card ID for uniquely identifying the memory card M is stored in the card ID storage means 133. Here, the card ID of the memory card M is given as MIDm. Furthermore, additional information of the memory card M is stored in the card additional information storage means 134. For example, an image information name that represents the memory card M is given as card-m.jpg, and this image information is as image 1621 shown in FIG. 4(c). The image 1621 represents an external appearance of the memory card M. Information which includes both or either of these can be given as additional information of the memory card M.

FIG. 4(b) is an example of a schematic structural diagram of the memory card N135. The memory card N135 includes an input and output means 136, an image storage means 137, a card ID storage means 138, and a card additional information storage means 139. A card ID for uniquely identifying the memory card N is stored in the card ID storage means 138. Here, the card ID of the memory card N is given as MIDn. Furthermore, the additional information of the memory card N is stored in the card additional information storage means 139. For example, an image information name that represents the memory card N is given as card-n.jpg, and this information is given as an image 1622 shown in FIG. 4(d). The image 1622 represents an external appearance of the memory card N. Information which includes both or either of these can be given as additional information of the memory card N.

Figure 5:
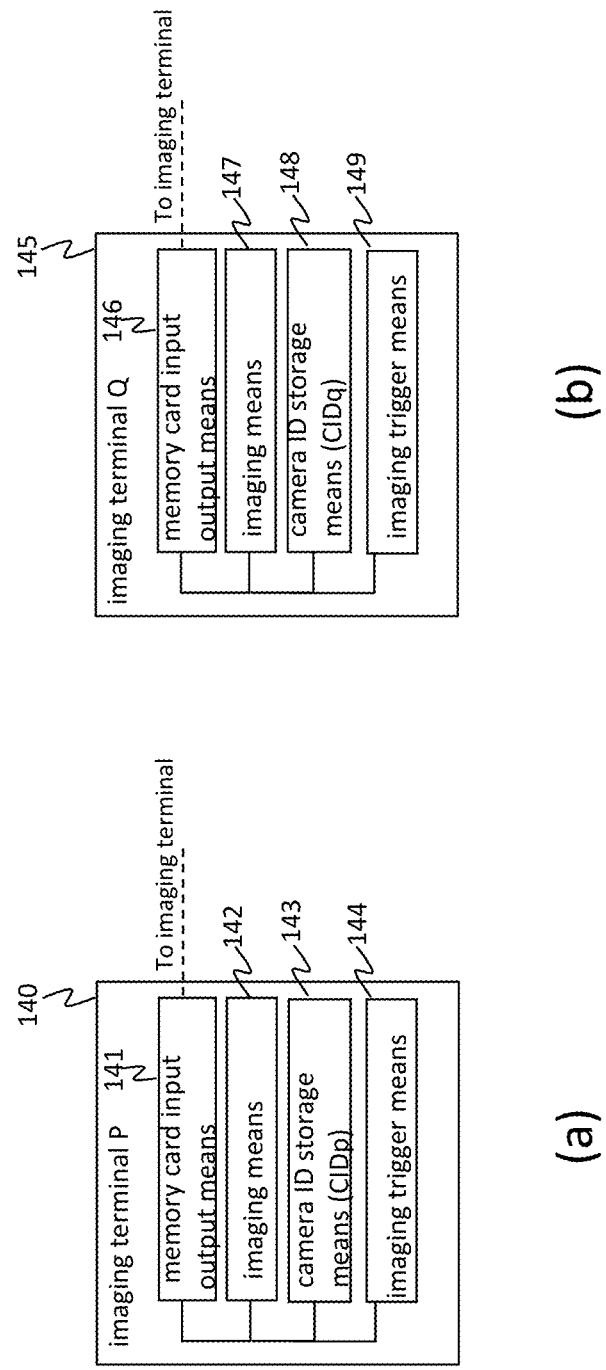
FIG. 5 is a schematic structural diagram of an imaging terminal related to an embodiment of the present invention.

FIG. 5 is an example of a schematic structural diagram of the imaging terminal P140 and the imaging terminal Q145. The imaging terminal P140 includes a memory card input and output means 141, an imaging means 142, a camera ID storage means 143, and an imaging trigger means 144. The imaging terminal Q includes a memory card input and output means 146, an imaging means 147, a camera ID storage means 148, and an imaging trigger means 149.

Figure 6:
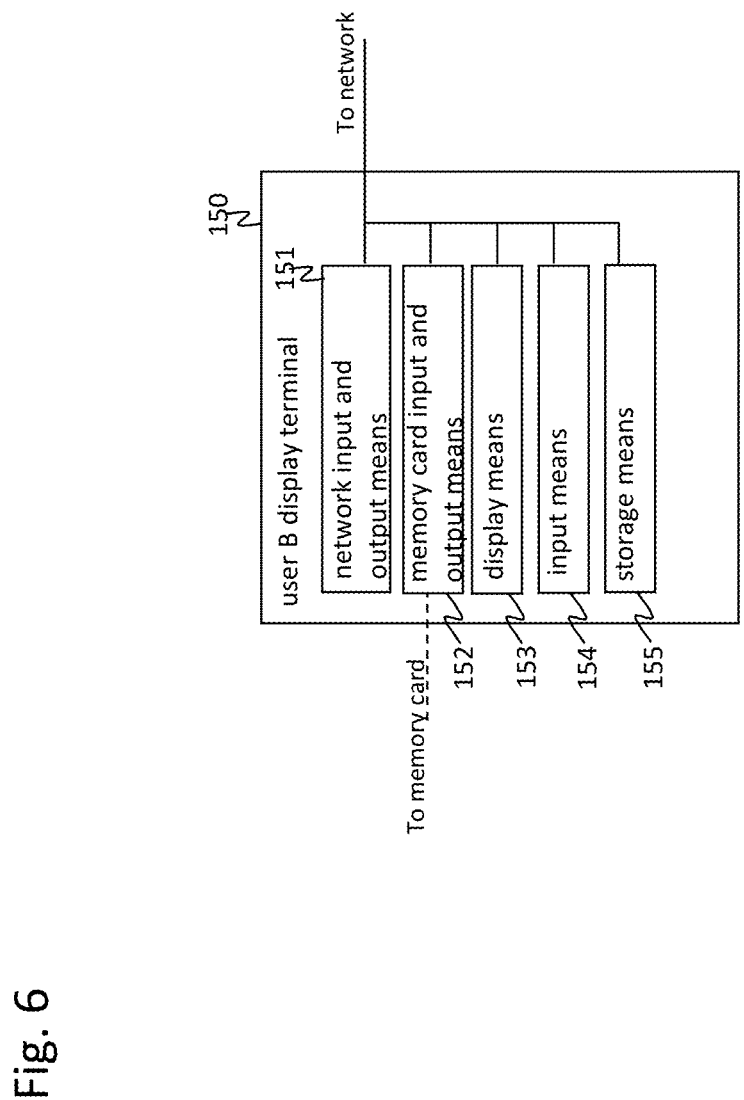
FIG. 6 is a schematic structural diagram of an information terminal related to an embodiment of the present invention.

FIG. 6 is an example of a schematic structural diagram of the display terminal B150. The display terminal B150 includes a network input and output means 151, a memory card input and output means 152, a display means 153, an input means 154, and a storage means 155.

Figure 7:
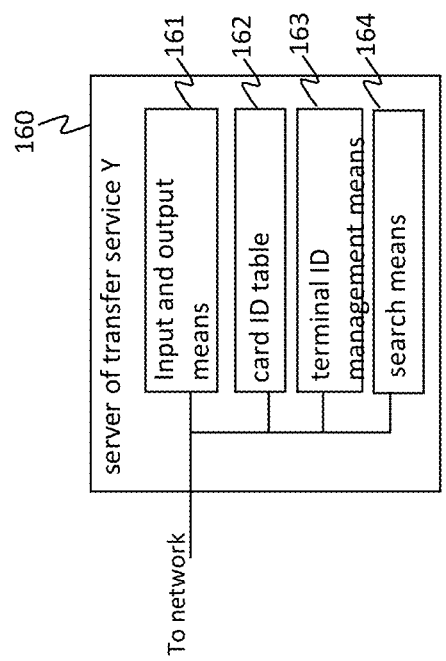
FIG. 7 is a schematic structural diagram of a server related to an embodiment of the present invention.

FIG. 7 is an example of a schematic structural diagram of the server Y160. The server Y160 includes an input and output means 161, a card ID table 162, a terminal ID management means 163, and a search means 164.

Figure 8:
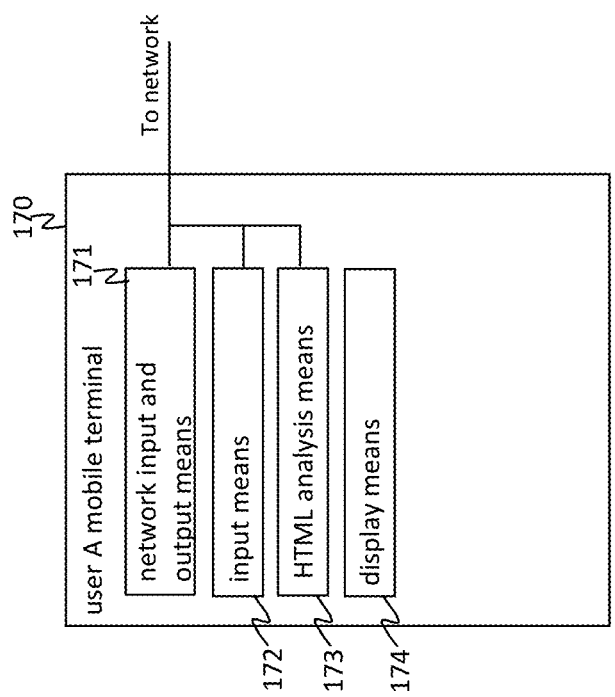
FIG. 8 is a schematic structural diagram of a mobile terminal related to an embodiment of the present invention.

FIG. 8 is an example of a schematic structural diagram of the mobile terminal A170. The mobile terminal A170 includes a network input and output means 171, an input means 172, an HTML analysis means 173, and a display means 174.

Figure 9:
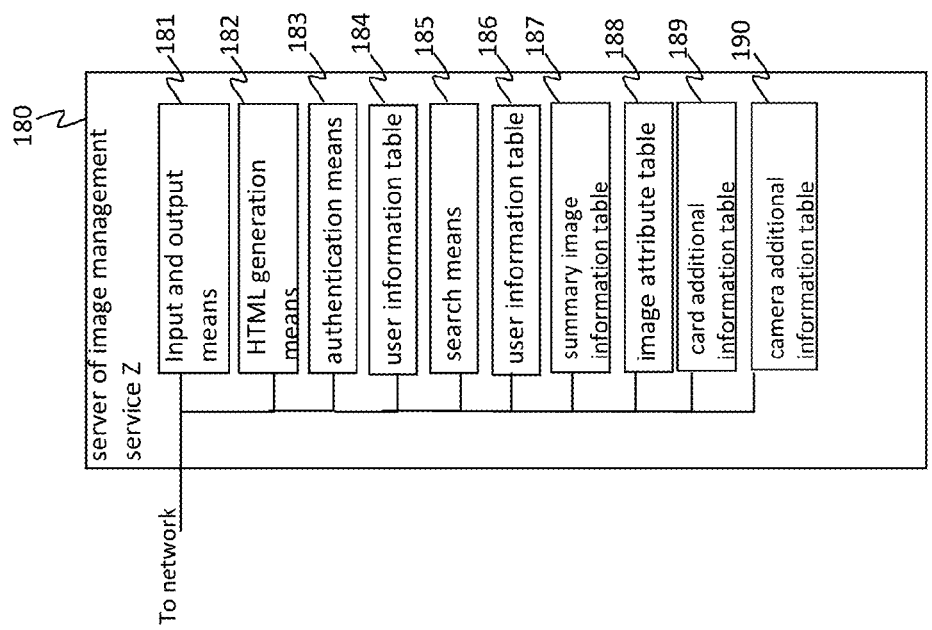
FIG. 9 is a schematic structural diagram of a server related to an embodiment of the present invention.

FIG. 9 is an example of a schematic structural diagram of the server Z180. The server Z180 includes an input and output means 181, an HTML generation means 182, an authentication means 183, a user information table 184, a search means 185, a user information table 186, a summary image information table 187, an image attribute table 188, a card additional information table 189, and a camera additional information table 190.

In the present specification, image information taken by an imaging device and stored in an image storage means of a memory card is an original image. In addition, an image obtained by processing an original image is referred to as a processed image of the original image. In an original image or a processed image of the original image, when two images are compared, an image with a large amount of information is referred to as a real and an image with a small amount of information is referred to as a summary image. For example, when an original image with the RAW format is converted to a JPEG format (Joint Photographic Experts Group) with less information, the original image is a real image and a processed image of this original image is a summary image. Furthermore, in the case where two processed images are generated from an original image, a processed image with a large amount of information is the real image and a processed image with a small amount of information is the summary image. If a real image is image information stored in the image storage means of an imaging terminal, then the image may be any image format such as RAW format, JPEG format, TIFF (Tagged Image File Format) format, or GIF (Graphics Interchange Format). The summary image may also be any image format such as JPEG format, RAW format, PNG (Portable Network Graphic) format, TIFF (Tagged Image File Format) format, or GIF format.

Three embodiments of the present invention are exemplified below. A summary of each embodiment is as follows. In the first embodiment, the user A takes images using the imaging terminal P140 and the imaging terminal Q145, and a group of images stored in the memory cards M130 and N135, the information terminal A100 and the server X120 is managed by the information terminal A100. In the second embodiment, the information terminal A100 obtains the card ID for identifying the memory card N135 in a state where the memory card N135 is attached to the information terminal A100, next the information terminal A100 sends the image information to the memory card M135 via the network 199 and the display terminal B150 in a state where the memory card N135 is attached to the display device B150, and the image information is displayed on the display terminal B150. In the third embodiment, a correlation of summary image information and a real image storage destination summary is held in the server Z180 and the user A performs similar image management as in Embodiment 1 through a Web browser of the mobile terminal A170.
(Embodiment 1)

An example of an embodiment of the present invention is explained using the flow diagram in FIG. 10. The user A operates the imaging trigger means 144 in a state where the memory card M130 is connected to the memory card input and output part 141 of the imaging terminal P. Via this operation, the imaging means 142 generates real image information and a real image ID for uniquely identifying each real image information, summary image information corresponding to each real image and a summary image ID for uniquely identifying each summary image information, sends these to the image storage means 132 via the memory card M input and output means 141 and the input and output means 131 of the memory card M, and the image storage means 132 correlates and stores these. In addition, a camera ID for uniquely identifying the imaging terminal P and camera additional information which are stored by the camera ID storage means 143 of the imaging terminal P, are correlated with real image information and corresponding real image ID and stored via the memory card input and output means 141 and the input and output means 131 of the memory card M (step S1001).

FIG. 11 (*a*) shows an example of information stored in the image storage means 132 of the memory card M after step 1001. The image storage means 132 includes a real image ID column 1101, a real image information column 1102, a summary image ID column 1103, a summary image information column 1104, a camera ID column 1105, and a camera additional information column 1106. In the example in FIG. 11 (*a*), a real image ID 1111 and real image information 1112 represented by 1121 and 1122 are stored. Below, the real image information and summary image information are denoted as " . . . . . . ". Real image information and summary image information and may be information of any format such as RAW, JPEG, TIFF, PNG, and GIF. In FIG. 11 (*a*), for example, the real image information 1112 correlated with the real image ID1111, summary image ID1113, summary image information 1114, camera ID1115, and camera additional information 1116 are correlated and stored. Here, the summary image ID, summary image information, camera ID, and the camera additional information do not have to be stored.

Furthermore, in FIG. 11, there may be a plurality of groups consisting of the summary image ID column and the summary image information column. In addition, the image storage means 132 is not required to be in a table format such as that shown in FIG. 11 and may be any structure as long as a real image ID, real image information, a summary image ID, and summary image information are correlated and stored.

Next, the user A extracts the memory card M from the imaging terminal P, attaches to the imaging terminal Q, and operates the imaging trigger means 149. Via this operation, the imaging means 147 generates real image information and a real image ID for uniquely identifying each of the real image information, and these are correlated and stored in the storage part 132 via the memory card input and output means 146 and the input and output means 131 of the memory card M. In addition, a camera ID for uniquely identifying the imaging terminal Q and camera additional information stored by the camera ID storage means 148 are sent to the image storage means 132 via the memory card input and output means 146 and the input and output means 131 of the memory card M. In addition, the real image information is correlated with a corresponding real image ID (step S1002).

While in this example the imaging means 142 of the imaging terminal P generates summary image information and a summary image ID, the imaging means 147 of the imaging terminal Q does not generate summary image information and a summary image ID.

In FIG. 11 (*b*), an example of information stored in the image storage means 132 of the memory card M after step 1002 is shown. In the example in FIG. 11 (*b*), in addition to the information that is stored in FIG. 11 (*a*), real image information 1132 and 1142, camera IDs 1135 and 1145, and camera additional information 1136 and 1146 are each correlated with the real image IDs 1131 and 1114 respectively and stored. In this example, because the imaging means 147 of the imaging terminal Q does not generate summary image information and a summary image ID, in FIG. 11 (*b*), summary image ID1133 and 1143 corresponding with the real image ID1131 and 1141 respectively, and summary image information 1134 and 1144 become information (a NULL value for example) corresponding to a blank.

In the example in FIG. 11, the real image ID and summary image ID are comprised from a common part and an additional part. For example, the real image ID1111 image is comprised from of a common part "P001" and an additional part "-org". In addition, the summary image ID1113 corresponding to this real image is composed of common part "P001" and additional part "-sum1". In this case, the additional part "-org" indicates a real image and "-sum1" indicates a summary image. In this way, it is possible to detect that real image information 1112 and a real image have been generated from the same original image just from ID information. In addition, in the present invention there may be a plurality of processed images obtained by processing an original image. As a result, the properties of the processed image may be included in the additional part of the summary image ID. For example, the additional portion "-sum2" may be used for high resolution summary image and the additional part "-sum1" may be used for a low resolution summary image. An additional part may include not only resolution information but also information indicating chromaticity, white balance, brightness, image rotation, and the content of processing an original image such as coordination. In addition, the real image ID and summary image ID may be of any format as long as they contain information which can detect that certain real image information and summary image information are generated from the same original image even without a combination of additional parts and common parts Next, the user A attaches the memory card N135 to the imaging terminal Q145 instead of the memory card M130 and operates the imaging trigger means 149. Via this operation, the imaging means 147 generates real image information and a real image ID for uniquely identifying each of the real image information, and these are correlated and stored in the image storage means 148 via the memory card input and output means 146 and the input and output means 136 of the memory card N. In addition, the camera ID for uniquely identifying the imaging terminal Q and the camera additional information stored by the camera ID storage means 148 are sent to the image storage means 137 via the memory card input and output means 146 and the input and output means 136 of the memory card N. In addition, the real image information is correlated with a corresponding real image ID and stored (step S1003).

An example of information stored in the image storage means 137 of the memory card N after step S1003 is shown in FIG. 12. The image storage means 137 includes a real image ID column 1201, a real image information column 1204, a summary image ID column 1203, a summary image information column 1204, a camera ID column 1205, and a camera additional information column. In the example in FIG. 12, the real image information 1212 and 1222 represented by the real image IDs 1211 and 1221 are stored. In addition, the camera ID 1215 and 1225 of the imaging terminals which took these images, and also the camera additional information 1216 and 1226 are stored. There may be a plurality of groups consisting of the summary image ID column and the summary image information column in FIG. 12. In addition, the image storage means 127 does not need to be the table format shown in FIG. 12, and may have any structure as long as a real image ID, real image information, a summary image ID, and summary image information are correlated and stored. In this example, because the imaging means 147 of the imaging terminal Q does not generate a summary image ID and summary image information, the summary image IDs 1213 and 1223 corresponding to the real images 1221 and ID1212 respectively, and the summary image information 1214 and 1224 become information corresponding to a blank.

In the process described above, an image taken by the imaging terminal P is stored in the memory card M, and an image taken by the imaging terminal Q is stored in the memory cards M and N. A user often uses a plurality of cameras and a plurality of memory cards when storing images in this way, which is common in photography.

Next, user A attaches the memory card M130 to the input and output means 102 of the information terminal A. Then, the input and output means 131 of the memory card M sends the real image ID in the state shown in FIG. 11 (*b*), the real image information, the summary image ID, the summary image information, the camera ID, and the camera additional information to the information terminal A100 via the network 199. Furthermore, the input and output means 131 of the memory card M sends a card ID for uniquely identifying the memory card M which is stored in the card ID storage means 133, and card additional information stored in the card additional information storage means 134 to the information terminal A. When the input and output means 102 of the information terminal A receives these, the real image information correlated with the real image ID, the summary image ID, and the summary image information are correlated and stored in the image information table 103. In addition, the camera ID received from the memory card M and the card ID are correlated with the real image ID and stored in the image attribute table 104. In addition, the card ID and the card additional information are correlated and stored in the card additional information table 105. Furthermore, the camera ID and the camera additional information are correlated and stored in the camera additional information table 109 (step S1004).

Next, user A attaches the memory card N135 to the input and output means 102 of the information terminal A. Then, the input and output means 136 of the memory card N sends the real image ID in the state shown in FIG. 12, the real image information, the summary image ID, the summary image information, the camera ID, and the camera additional information to the information terminal A100 via the network 199. Furthermore, the input and output means 136 of the memory card N sends a card ID for uniquely identifying the memory card N which is stored in the card ID storage means 138, and card additional information stored in the card additional information storage means 139 to the information terminal A. When the input and output means 102 of the information terminal A receives these, the real image information correlated with the real image ID, the summary image ID, and the summary image information are correlated and stored in the image information table 103. In addition, the camera ID received from the memory card N and the card ID are correlated with the real image ID and stored in the image attribute table 104. In addition, the card ID and the card additional information are correlated and stored in the card additional information table 105. Furthermore, the camera ID and the camera additional information are correlated and stored in the camera additional information table 109 (step S1005). Furthermore, the information in the image information table 103 and the image attribute table 104 may also be stored in one table.

An example of the image information table 103 after step S1005 is shown in FIG. 13. The real image IDs 1311,1321, 1331,1341 and the real image information 1312,1322,1332, 1342 which signify these real image IDs, and the summary image IDs 1313, 1323 and the summary image information 1314, 1324 which signify these summary image IDs respectively are information that is copied from the image storage means 132 of the memory card M in step S1004. Similarly, real image ID's 1351, 1361 and the real image information 1352, 1362 which signify these image IDs are information that is copied from the image storage means 137 memory card N in step S1005. At the time when step S1005 is executed, the summary image IDs 1343, 1353, 1363 and the summary image information 1334,1344,1354,1364 which signify these summary image IDs are information corresponding to a blank. These summary image IDs and summary image information are generated in the nest step S1006 and stored in the image information table 103.

An example of the image attribute table 104 after step S1005 is shown in FIG. 14. The camera IDs 1412, 1422, 1432 and 1442 are camera IDs copied from the image storage means 132 of the memory card M. In addition, the camera IDs 1452 and 1462 are camera IDs copied from the image storage means 137 of the memory card N. The real image storage destinations 1413, 1423, 1433, and 1443 are card IDs copied from the card ID storage means 133 of the memory card M. In addition, the real image storage destinations 1453 and 1463 are card ID's copied from the card ID storage means 138 of the memory card N. In FIG. 14, the camera ID column 1402 represents which imaging terminal took each image, and the real storage destination column 1403 represents in which memory card real images are stored. Via the processes in step S1004 and S1005, because all of the real images of the real image IDs 1411, 1421, 1431,1441,1451, and 1461 are stored in the image information table 103 of the information terminal A, TIDa which is a terminal ID for uniquely identifying the information terminal A is stored in the real storage column 1403 in the image attribute table 104 as all of these real storage destination. In FIG. 14, for example, storing TIDa and MIDm 1413 in the real storage destination 1403 of the real image ID1411 row indicates that the real image information is stored in both the information terminal A and the memory card M.

A real image ID and summary image ID are generated by the imaging terminal P and the imaging terminal Q and stored in the image information table and the attribute image table of the information terminal A. In the present embodiment, the real image information and the summary image information are assumed to be able to be uniquely identified among all images stored by the information terminal A using a real image ID and a summary image ID. Actually, with respect to different image information, there is a possibility that the imaging terminal P and the imaging terminal Q generate the same real image ID. In this case, a problem occurs wherein a real image to be searched cannot be uniquely identified even if the image attribute table 104 and the image information table 103 are searched using a real image ID as a search key. In this way, in the case where the uniqueness of a real image ID and a summary image ID cannot be guaranteed, a global ID column is added to the image information table 103 shown in FIG. 13 and the image attribute table 104 shown in FIG. 14. Furthermore, in step S1005 and step S1004, a global ID generation means 112 of the information terminal A generates a global ID for uniquely identifying each of real image information and the global ID is correlated with each of the real image ID and the summary image ID stored in advance. In this case, in each step below, by making using a global ID as a search key instead of a real image ID, it is possible to solve the problem in the case where it is not possible to uniquely identify the real image information using a real image ID. In addition, in the case where the uniqueness of a real image ID has been guaranteed within an imaging terminal, it is possible to guarantee the uniqueness of the image information in the information terminal A by a combination of a camera ID and the real image ID generated by the imaging terminal. Below and explanation is given assuming that the uniqueness of a real image ID generated by an imaging terminal is guaranteed with each imaging terminal. Therefore, it is possible to uniquely identify real image information and the summary image information using a combination of a real image ID and a camera ID without using a global ID.

Figure 15:
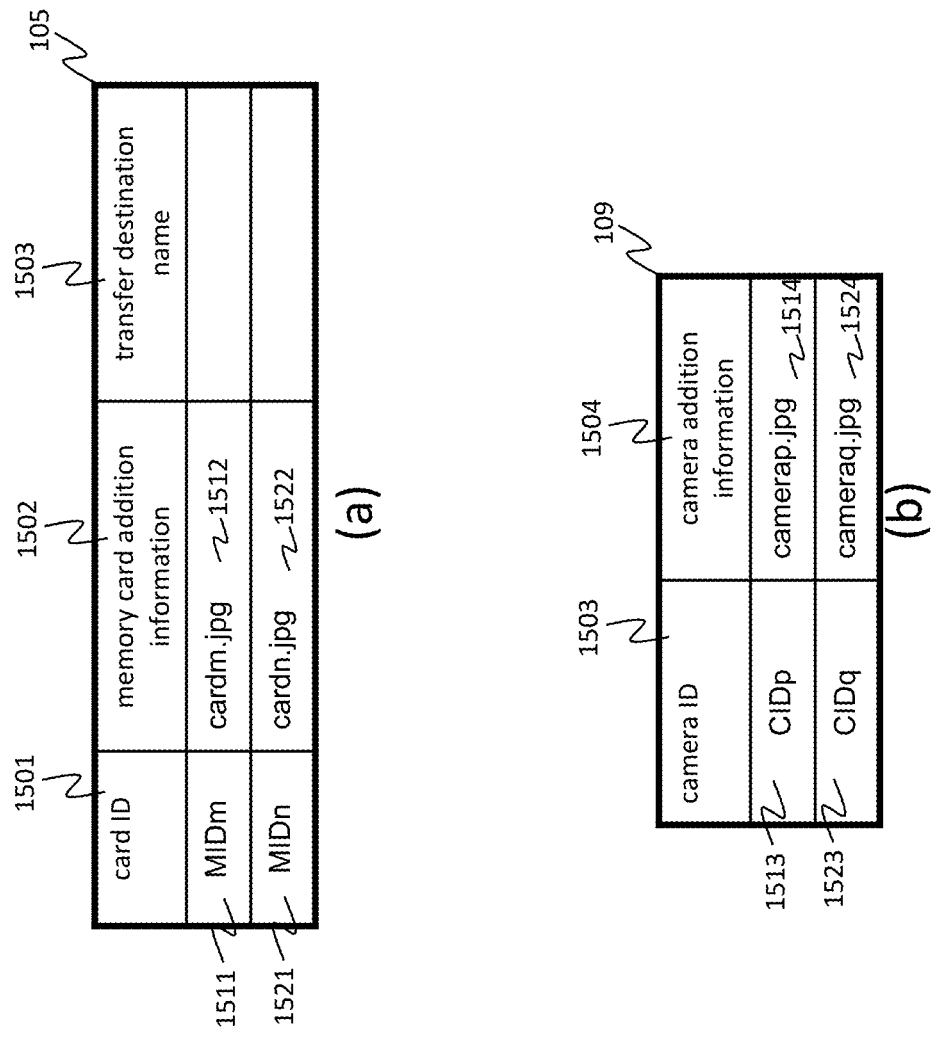
FIG. 15 is a diagram of one example of information stored by a card additional information table related to an embodiment of the present invention.

An example of the card additional information table 105 after step S1005 is shown in FIG. 15 (*a*). The card additional information table 105 is comprised from a card ID column 1501, a memory card additional information column 1502, and a transfer destination name column 1502. The transfer destination name column is used in the second embodiment described below. The card ID1511 obtained from the memory card M in step S1004 is correlated with memory card additional information 1512 of the memory card M and stored. In addition, the card ID1521 obtained from the memory card N in step S1005 is correlated with memory card additional information 1522 of the memory card N and stored. Furthermore, an example of the camera additional information table 109 after step S1005 is shown in FIG. 15(*b*). The camera additional information table 109 is comprised of a camera ID column 1503 and a camera additional information column 1504. The camera ID1513 obtained from the memory cards M and N in step S1005 and S1004 is correlated with camera additional information 1514 of the imaging terminal P and stored. In addition, the camera ID 1523 obtained from the memory card N in step S1005 is correlated with camera additional information 1524 of the imaging terminal and Q and stored.

At the stage where step S1005 is executed, the summary image IDs 1333, 1343, 1353, and 1363 and the summary image information which indicate these in FIG. 13 are blank. The reason for this is that while the imaging means 142 of the imaging terminal P generates a summary image together with a real image, the imaging means 147 of the imaging terminal Q does not generate a summary image. Therefore, the real image generation means of the information terminal A generates summary images from each real image information 1332, 1342, and 1352 and stores them in the image information table 103 (step S1006). The summary image IDs 1333, 1343, 1353, and 1363 and the summary image information 1334, 1344, 1354, and 1364 which indicate these IDs in FIG. 13 are generated as a result of step S1006 and stored in the image information table 103. In an embodiment of the present invention, an imaging terminal may or may not generate a summary image. In the case where of an imaging terminal which does not generate a summary image such as imaging terminal Q, the summary image generation means 108 of information terminal A generates a summary image and stores the image in the image information table 103.

Figure 16:
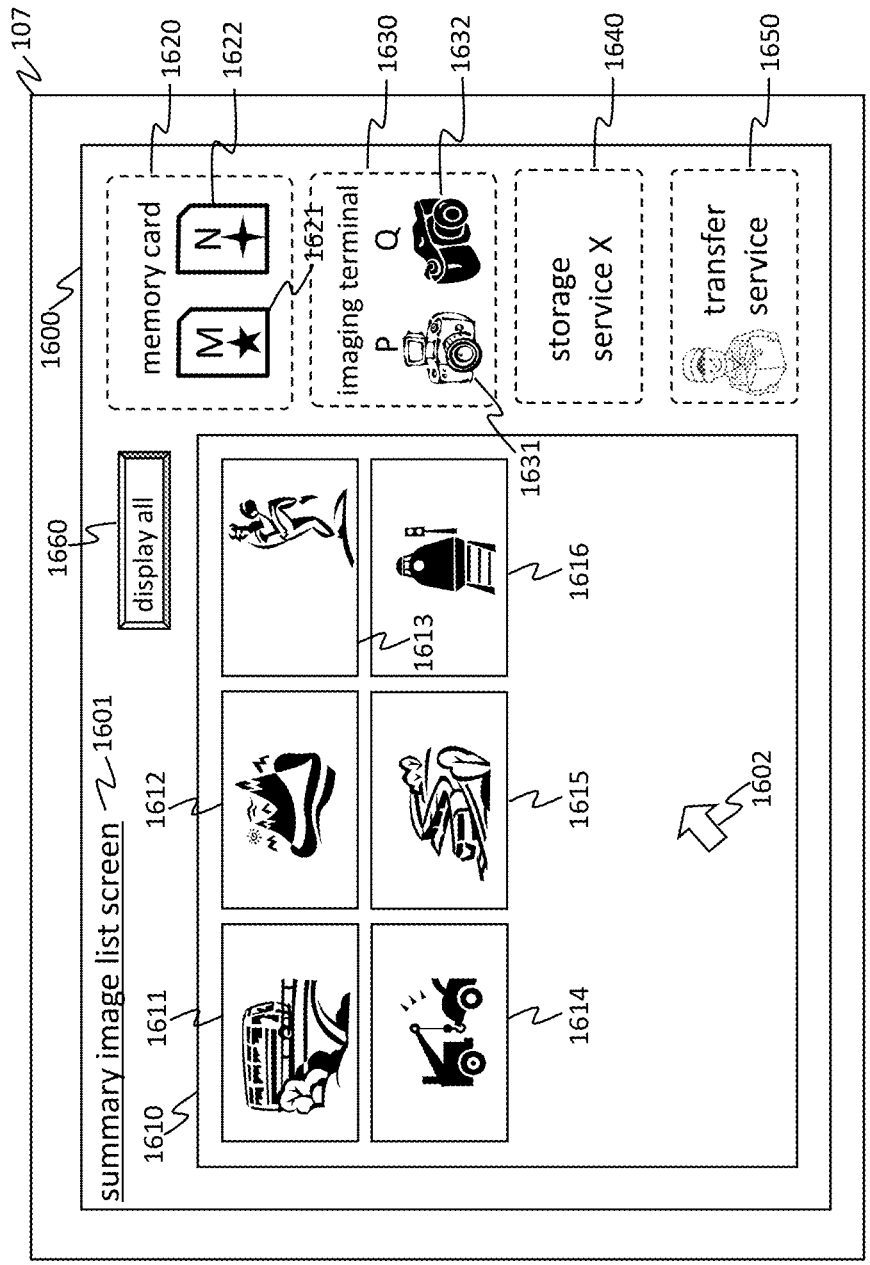
FIG. 16 is a diagram of one example of a summary image list display related to an embodiment of the present invention.

Next, when the user A instructs the information terminal A to display a summary image list screen image through the input means 106, the display means 107 displays the summary image list screen (step S1007). An example of the summary image list screen is shown in FIG. 16. The summary screen 1601 includes display 1601 which shows that it is a summary image list screen, a screen elements specifying cursor 1602, a summary image display part 1610, a memory card display part 1620, an imaging terminal display part 1630, an storage service X display part 1640, a transfer service display screen 1650, and a button 1660 for displaying all. In the example shown in FIG. 16, the summary images 1611 to 1616 are displayed in the summary image display part 1610. These summary images show that real image information stored in the image information table 103 is displayed. The summary image information 1314, 1324,1334,1344,1354, and 1364 shown in FIG. 13 correspond to the summary images 1611,1612,1613,1614,1615, and 1616 shown in FIG. 16 respectively. A memory card image 1621 of the memory card M and a memory card image 1622 of the memory card N are displayed in the memory card display part 1620. Each of these images shows that image information of the memory card additional information 1512 and 1522 stored in the card additional information table 105 shown in FIG. 15 (*a*) are displayed by the display means 107. In addition, the image 1631 of the imaging terminal P and the image 1632 of the imaging terminal Q are displayed in the imaging terminal display part 1630. Each of these images shows that image information of the memory card additional information 1514 and 1524 stored in the camera additional information table 109 shown in FIG. 15 (*b*) are displayed by the display means 107.

Figure 17:
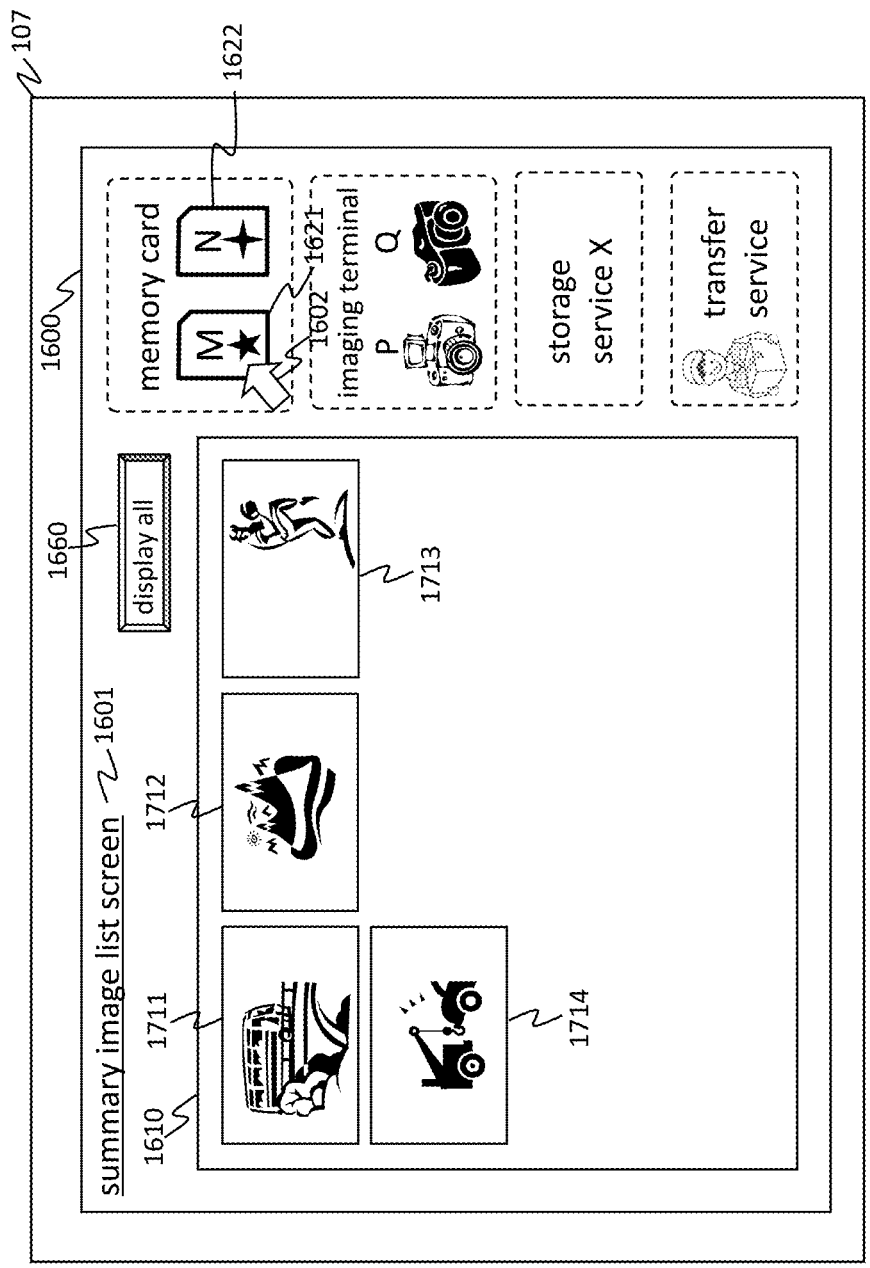
FIG. 17 is a diagram of one example of an image displayed by a display means related to an embodiment of the present invention.

Next, the user A operates the input means 106 of the information terminal A, moves the cursor 1602 displayed on the display means 107, and selects the image 1621 of the memory card M (step S1008). Then, the search means 110 searches the real storage destination column 1403 of the image attribute table 104 using MIDm which is a card ID of the memory card M as a search key. The real image IDs 1411, 1421, 1431, and 1441 are obtained in the example in FIG. 14. These are real image IDs of real images stored in the memory card M in addition to the information terminal A. Next, the search means 110 searches the image information table 103 using these real image IDs as a search key, and the search means 110 sends summary image information obtained as a result to the display means 107. Display means 107 displays the summary image information received here on the summary image display means 1610 (step S1009). In the example in FIG. 13, summary image information 1314, 1324, 1334, and 1344 are obtained as a search result and sent to the display means. As a result, the image displayed on the display means is shown in FIG. 17. The summary images 1711, 1712, 1713, and 1714 are displayed in the summary image display means 1610. These images show that the summary image information 1314, 1324, 1334, and 1344 in FIG. 13 are displayed. Via this operation, the summary images of real images stored in the memory card M are selectively displayed in the summary image display means 1610.

Figure 18:
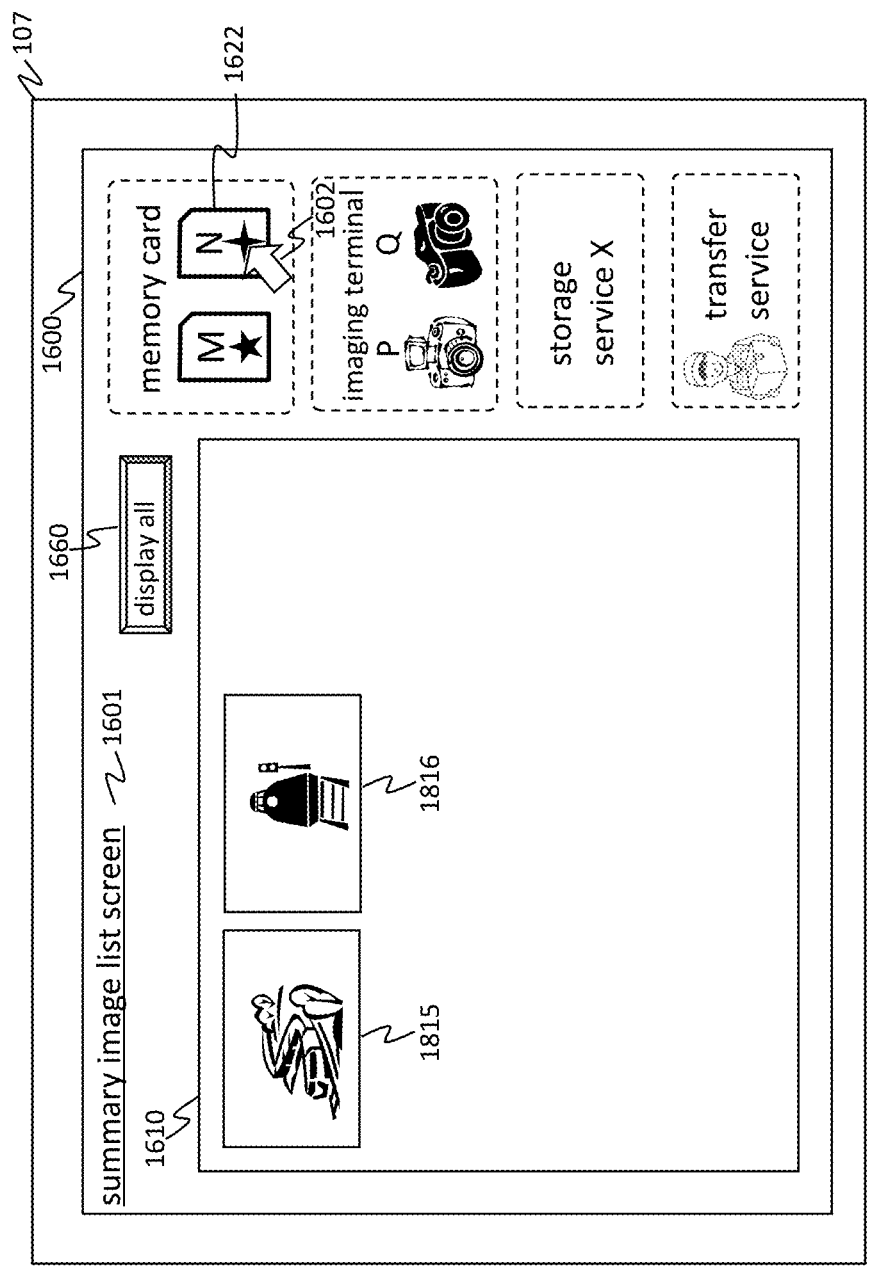
FIG. 18 is a diagram of one example of an image displayed by a display means related to an embodiment of the present invention.

Next, user A operates the input means 106 of the information terminal A, moves the cursor 1602 displayed on the display means 107, and selects the image 1622 of the memory card N (step S1010). Then, the search means 110 searches the real image attribute table, and searches the real storage destination column 1403 using MIDn which is a card ID of the memory card N as a search key. The real image IDs 1451 and 1461 are obtained in the example in FIG. 14. These are the real image IDs of real images stored in the he information terminal A and the memory card N. Next, the search means 110 searches the image information table 103 using these real image ID's as a search key, and the search means 110 sends the summary image information obtained as a result to the display means 107. The display means 107 displays the summary image information received here on the summary image display means 1610 (step S1011). In the example in FIG. 13, the summary image information 1354 and 1364 are obtained as a search result and sent to the display means. As a result, the image displayed on the display means is shown in FIG. 18. The summary images 1815 and 1816 are displayed in the summary image display means 1610. These images show that the summary image information 1354 and 1364 in FIG. 13 are displayed. Via this operation, the summary images of the real images stored in the memory card N are selectively displayed in the summary image display means 1610.

Figure 19:
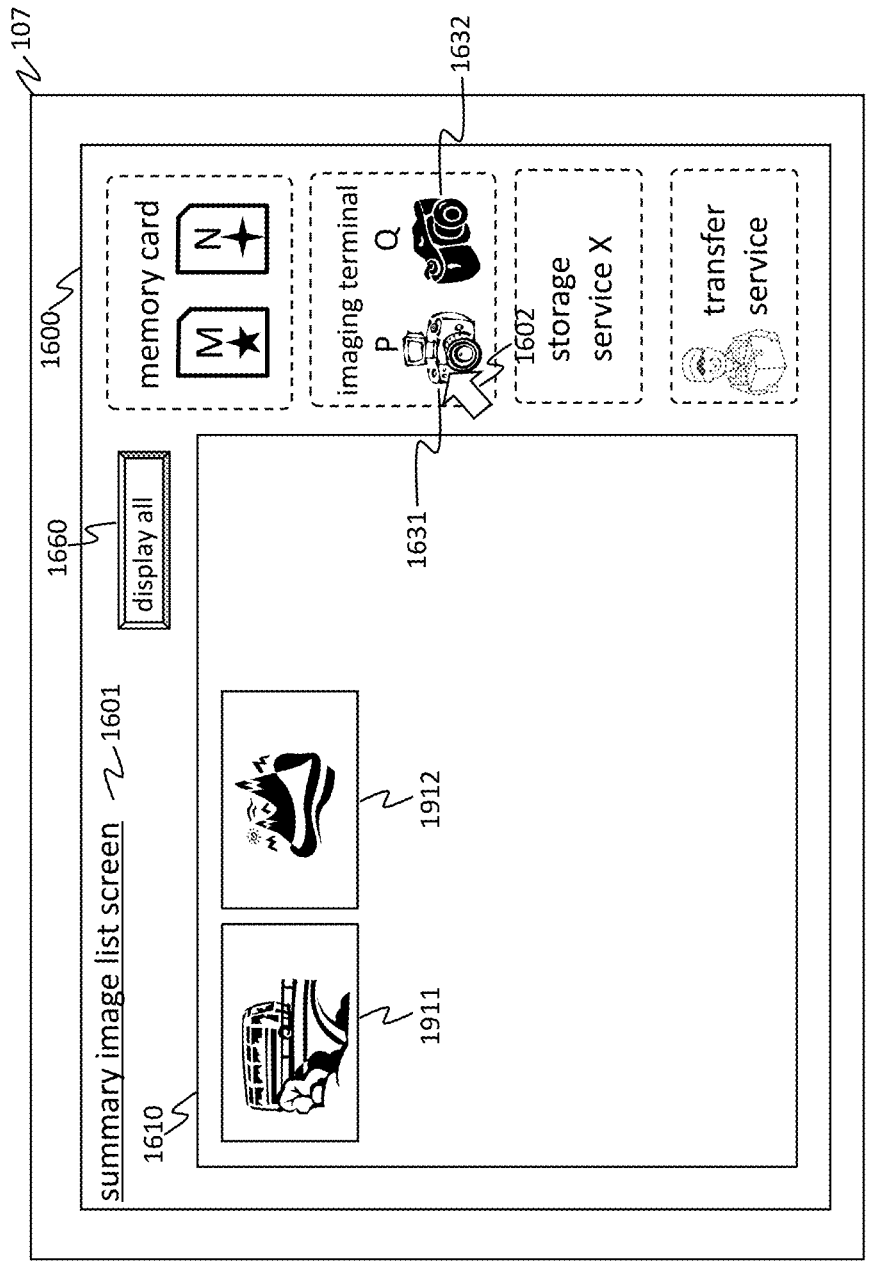
FIG. 19 is a diagram of one example of an image displayed by a display means related to an embodiment of the present invention.

Next, the user A operates the input means 106 of the information terminal A, moves the cursor 1602 displayed on the display means 107, and selects the image 1631 of the imaging terminal P (step S1012). Then, the search means 110 searches the real image attribute table, and searches the real storage destination column 1402 using CIDp which is a card ID of the imaging terminal P as a search key. The real image IDs 1441 and 1421 are obtained in the example in FIG. 14. These are real image IDs of real images taken by the imaging terminal P. Next, the search means 110 searches the image information table 103 using these real image IDs as a search key, and the search means 110 sends summary image information obtained as a result to the display means 107. The display means 107 displays the summary image information received here on the summary image display means 1610 (step S1013). In the example in FIG. 13, the summary image information 1314 and 1324 are obtained as a search result and sent to the display means 107. As a result, the image displayed on the display means is shown in FIG. 19. The summary images 1911 and 1012 are displayed in the summary image display means 1610. These images show that the summary image information 1314 and 1324 in FIG. 13 are displayed. Via this operation, summary images of images taken by the imaging terminal P are selectively displayed in the summary image display means 1610. Because the process where the user A selects image 1632 of the imaging terminal Q in the summary image list screen is the same as in steps S1012 and S1013, an explanation of this process is omitted.

Next, the user A moves the cursor 1602 by operating the input means 106 of the information terminal A, and selects the button 1660 for displaying all. The button 1660 for displaying all can be selected at any time after step S1007. When this is selected, the summary image display means 1610 displays all the summary images stored in the image information table 103 by the terminal A. In the present embodiment, the process returns to the state shown in FIG. 16 (step S2001). Next, the user A move the cursor 1602 by operating the input means 106 of the information terminal A and selects summary images 1611, 1613 and 1616. The user A then moves the cursor 1602 and selects a storage service X display part (step S2002). This operation by the user A corresponds to providing an instruction to the information terminal A to copy a real image corresponding to the selected summary image to the storage service.

Figure 21:
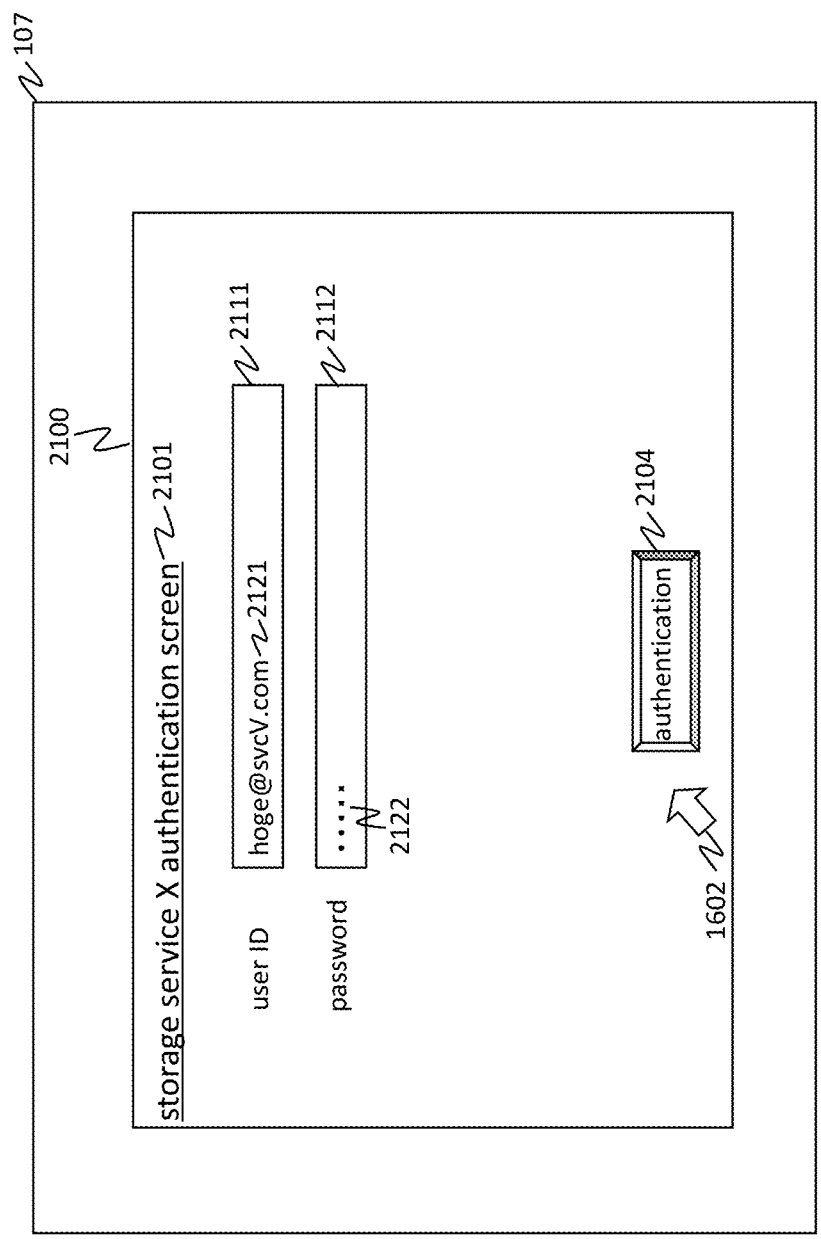
FIG. 21 is a diagram of one example of an authentication screen of a storage service related to an embodiment of the present invention.

Next, the network input and output means 101 of the information terminal A sends a usage request of the storage service by the user A to the server X via the network 199. When the input and output means 121 of the server X receives this request, the HTML generation means 122 generates an HTML code for displaying an authentication screen, and the input and output means 121 sends the code to the information terminal A via the network 199. In the information terminal A, when the network input and output means 101 receives the code, the display means 107 displays the authentication screen of the storage service X after analysis by the HTML analysis means 111. An example of an authentication screen of the storage service X is shown in FIG. 21. The display means 107 includes a browser window 2100. Browser window 2100 includes a display 2101 for displaying that this is the authentication screen of the storage service X, a user ID input part 2111, a password input part 2112, and an authentication button 2104. Next, user A operates the input means and inputs a user ID 2121 and a password 2122 used for authentication of the storage service X to the information terminal A. Then network sending and receiving means 101 sends the input user ID and the password to the server X120 via the network 199. When sending and receiving means 121 of the server X receives this, the authentication means 123 searches the user table 126 using the received user ID of the user A as a search key. When confirmation or match of the password correlated and stored in advance with the user ID of the user A in the user information table 126 and the password received from the information terminal A is detected, authentication of the user A by the authentication means is completed (step S2003).

When authentication of the user A by the server X is completed, the search means 110 of the information terminal A searches for the real image IDs 1311, 1331, and 1361 and the real image information 1312, 1332, and 1362 corresponding to the summary images 1611, 1613, and 1616 selected in step S2002 from the image information table. Next, the network input and output part 101 sends three sets of these real images, real image information stored in the image information table and correlated with these real images, and a camera ID stored in the image attribute table to the server X120 via the network 199 (step S2004). In addition, here the information terminal A may send a camera ID stored in the image attribute table 104 and correlated with a real image ID to the server X. In addition, the image attribute table 104 correlates and stores SIDx which is a service ID for uniquely identifying the storage service X with each of real image IDs 1411, 1431, and 1461 (step S2005). An example of information stored in the image attribute table 104 after step S2005 is executed is shown in FIG. 22. The SID 2213, 2233, and 2263 are correlated and stored with the real image ID's 1411, 1431, and 1461 respectively.

Figure 23:
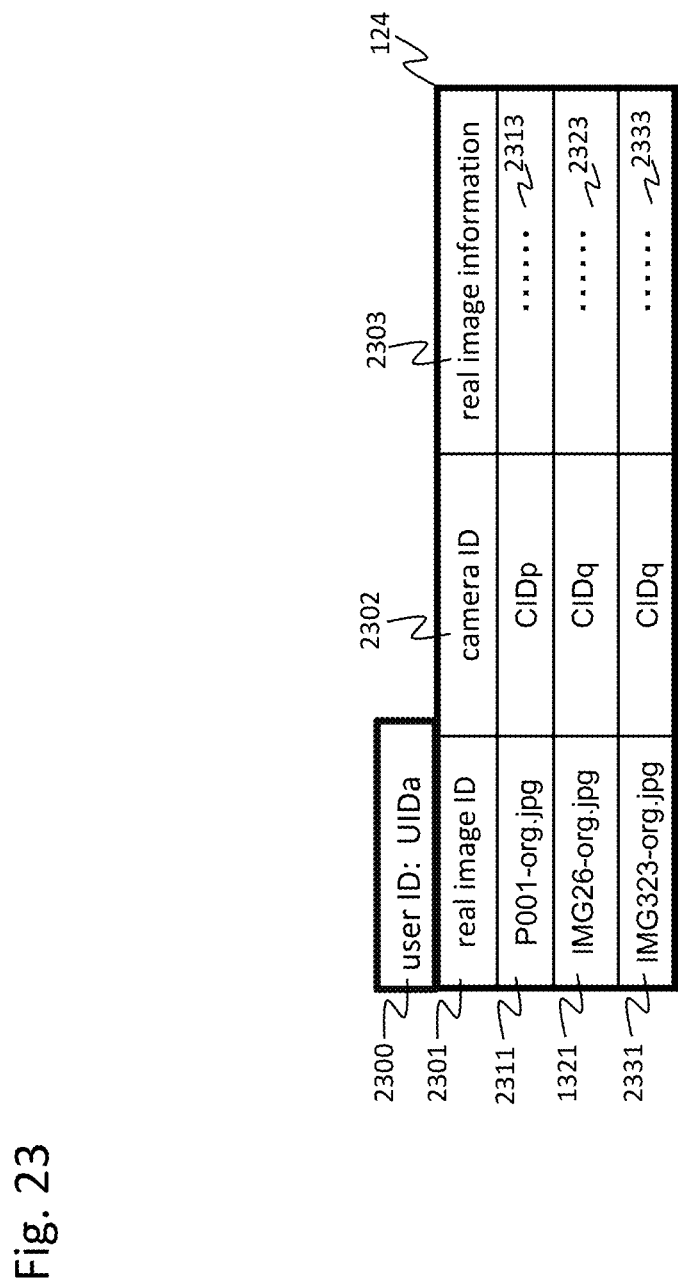
FIG. 23 is a diagram of one example of information stored in an image information storage means related to an embodiment of the present invention.

In addition, the input and output means 121 of the server X receives the real images sent from the information terminal A in step S2004 and stores in the image information storage means 124 (step S2006). An example of the image information storage means 124 is shown in FIG. 23. The mage information storage means 124 includes a user ID storage area, a real image ID column 230, a camera ID column 2302, and a real image information column 2303. In the present embodiment, it is explained that it is possible to uniquely identify real image information using a combination of a real image ID and a camera ID. In the case where it is not possible to uniquely identify real image information using a combination of a real image ID and a camera ID and, the image information storage means 124 may also be included with the global ID column described above.

Figure 24:
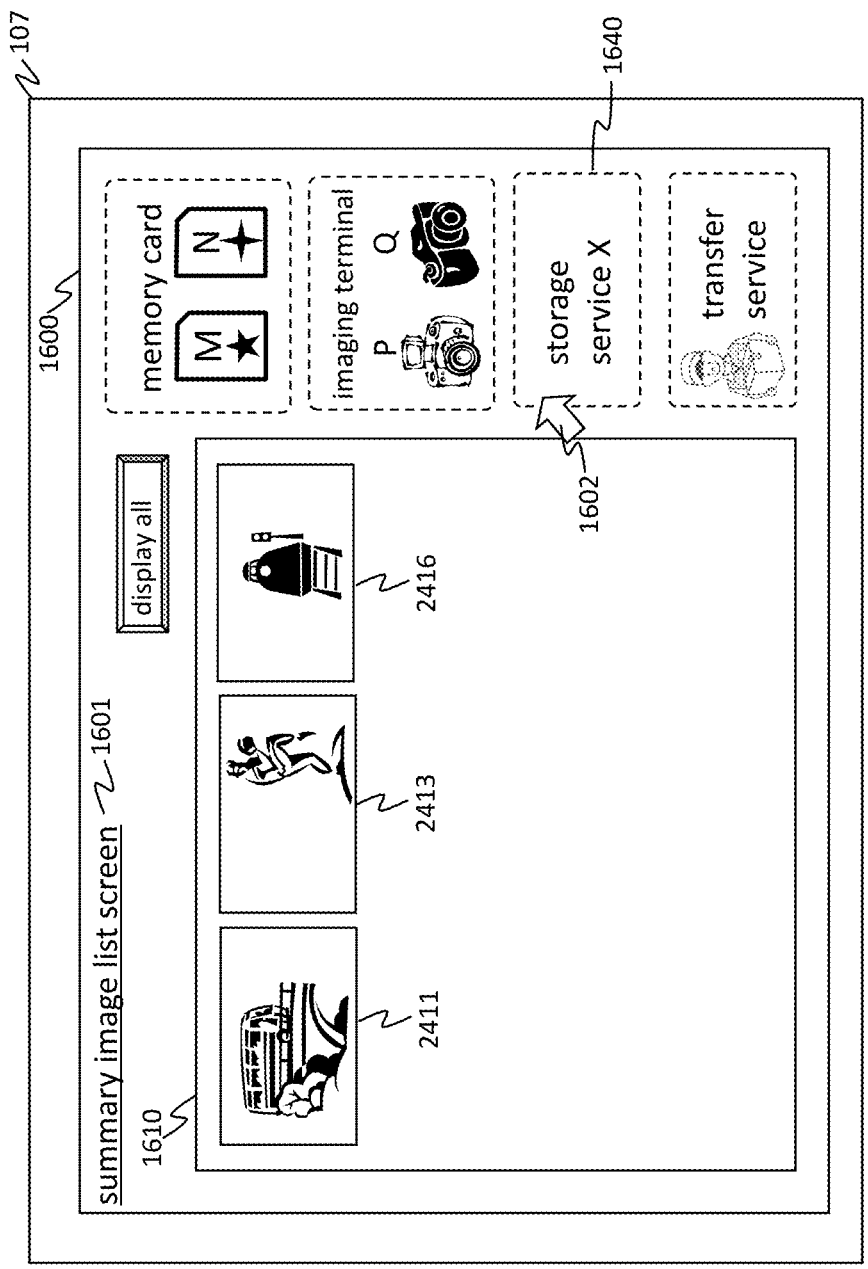
FIG. 24 is a diagram of one example of an image displayed by a display means related to an embodiment of the present invention.

Via the processes in steps S2002 to S2006, the real image information 1312, 1332, and 1362 in FIG. 13 are stored in the image information storage means 124 of the server X. In this state the user A operates the input means 106 of the information terminal A, moves the cursor 1602 displayed on the display means 107, and selects the storage service X display means 1640 (step S2007). Then, the search means 110 searches the real storage destination column 1403 of the real image attribute table 104 using SIDx which is a service ID of the storage service X as a search key. The real image IDs 1411, 1431, and 1461 are obtained in the example in FIG. 22. These are the real image IDs of the real images stored in the storage service X in addition to the information terminal A. Next, the search means 110 searches the image information table 103 using these real image IDs as a search key, and the search means 110 sends summary image information obtained as a result to the display means 107. The display means 107 displays the summary image information received at this time on the summary image display means 1610 (step S2008). In the example in FIG. 13, the summary image information 1314, 1334, and 1364 are obtained as a search result and sent to the display means 107. As a result, the image displayed on the display means is shown in FIG. 24. The summary images 2411, 2413, and 24132 are displayed in the summary image display means 1610. These images show that the summary image information 1314 and 1334 in FIG. 13 are displayed. Via this operation, summary images of images stored in the storage service X are selectively displayed in the summary image display means 1610. Here, although only one storage service was explained as an example, there may be a plurality of storage services such as a memory card or imaging terminal.

Now, storage capacity of the storage means in the information terminal A is assumed to be insufficient for centralized management of these images. Thus, the user A may sometimes operate the input means 106 in order to delete a part of all of the real image information in the column 1302 of the image information table 104 shown in FIG. 13. Actually, among the information stored in the image information table 103, the image attribute table 104, the card additional information table 105, and the camera additional information table 109, the capacity of the real image information column 1302 is assumed to be the largest. Consequently, by deleting a part of all of the real image information in the column 1302, the possibility that the problem of insufficient storage capacity in the information terminal A can be resolved is high.

For example, it is assumed that the real image information 1352 has been deleted from the image information table 103. Although the real image information 1352 has been deleted from the image information table 103, the corresponding real image ID1351, the summary image ID 1353, the summary image information 1354, the camera ID 1452, and the real storage destination 1453 are not deleted. Referring again to FIG. 14, when the real image information 1352 is deleted from the information terminal A, the real storage destination memory 1454 is deleted from the image attribute table 104. In this way, the information terminal A can manage the fact that the summary image information which indicates the real image ID 1451 is stored not in the information terminal A but only in the memory card N1453.

Figure 20:
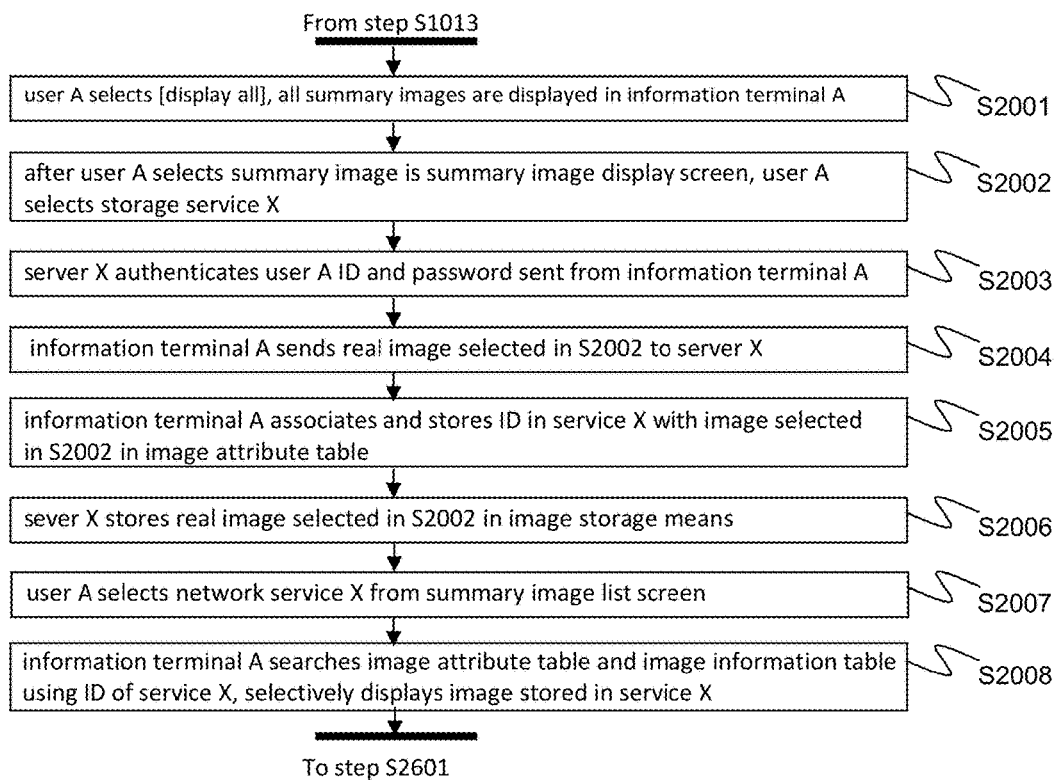
FIG. 20 is a flowchart of processes related to an embodiment of the present invention.
Figure 25:
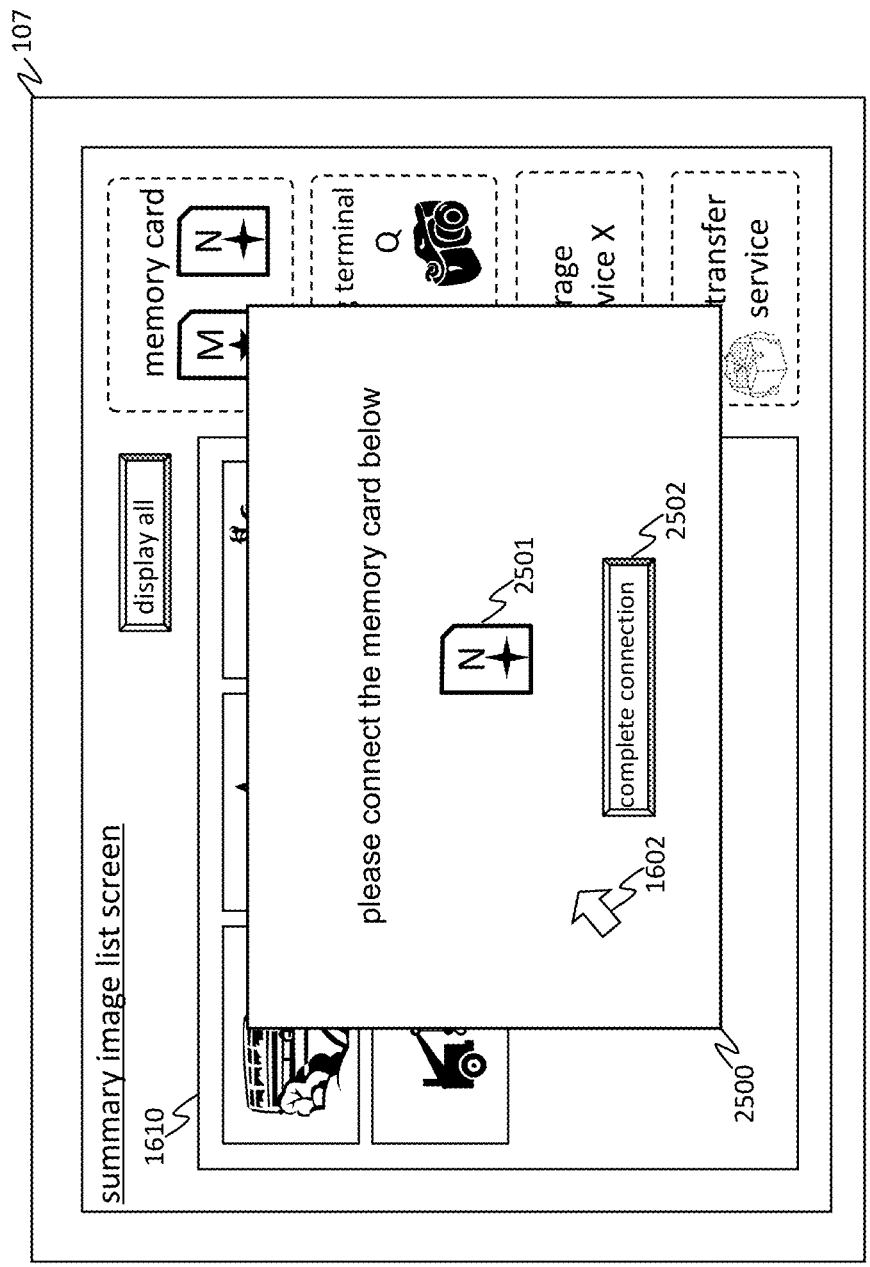
FIG. 25 is a diagram of one example of a connection request screen of a memory card related to an embodiment of the present invention.
Figure 26:
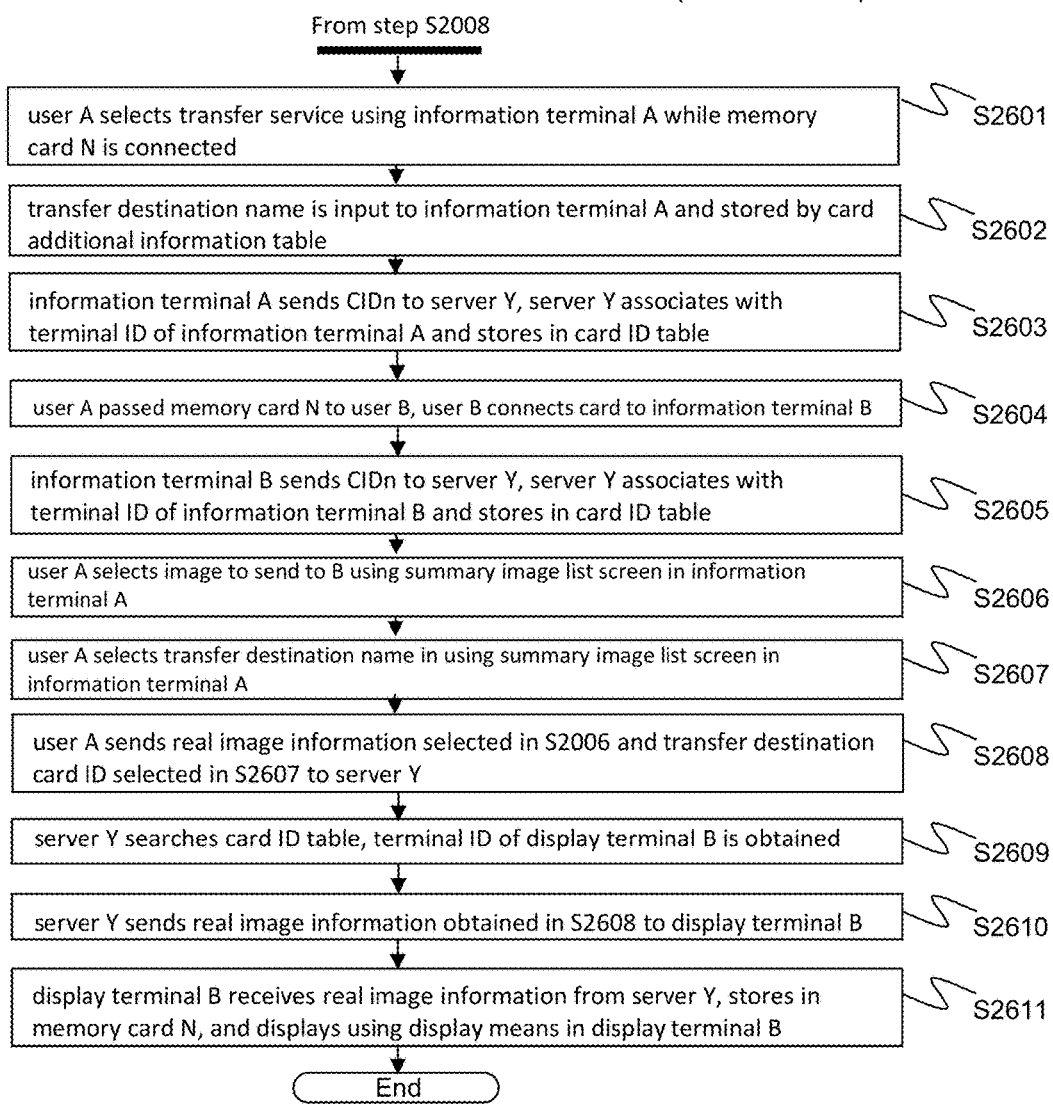
FIG. 26 is a flowchart of processes related to an embodiment of the present invention.

In this way, it is possible to carry out the process explained using the flowcharts of FIG. 10 and FIG. 20 even in the state where real image information 1352 is removed from the information terminal A. In this state, the user A carries out processes requiring the real image information 1352 in the information terminal A such as enlarging the display of an image in the display means 107, printing using the printing means 113, copying real image information to the memory card M, and copying real image information to the storage service X. Referring to FIG. 22, it is possible to specify a memory card or a storage service in which real image information is stored by searching the real storage destination column correlated and stored with a required real image ID. For example, in the case where the user A instructs the information terminal A to enlarge the display of the image which indicates the real image ID 1351 using the input means 107, the search part 110 searches the image attribute table 104 using a real image ID which indicates the real image information 1352 as a search key. As a result, the card ID 1453 of the memory card N is obtained as a real storage destination. At this time, in order for the information terminal A to obtain real image information, the display part 107 displays a connection request screen of memory card N. An example of a connection request screen of memory card N is shown in FIG. 25. The connection request screen window includes an image 2501 of the memory card N which becomes a storage destination, and a connection completion button 2502. The image 2501 of memory card N displays the memory card additional information 1522 of the card additional information table 105.

As described above, an information terminal is provided arranged with an input and output part for inputting and outputting to and from an image storage device which stores image information taken by the imaging terminal, a storage part for associating and storing image identification information for identifying image information, summary image information having a smaller amount of information than the image information and device identification information for identifying the image storage device, and a display part as Embodiment one. An example of the operations of the information terminal is as follows. The device identification information stored in the storage part is displayed on the display part. In addition, the information terminal displays on the display part the summary image information correlated with the device identification information selected from the device identification information displayed on the display part. Also, the information terminal displays image information on the display part correlated with the summary image information selected from the summary image information displayed on the display part.

In addition, a memory card is provided arranged with an image storage part for storing image information taken by the imaging terminal, and an input and output part which performs input and output with the information terminal and performs input and output to and from the imaging terminal which can connect to a network. An example of the operations of the memory card is as follows. The input and output part receives image information from the imaging terminal. The image information is stored in the image storage part. The input and output part correlates and sends memory card authentication information for uniquely identifying the memory card within a network and image information of an external appearance of the memory card with the image information to the information terminal.

In addition, a memory card is provided arranged with an image storage part for storing image information taken by the imaging device, and an input and output part which performs input and output with the information terminal and performs input and output to and from the imaging terminal which can connect to a network. An example of the operations of the memory card is as follows. The input and output part receives image information from the imaging terminal. The image information is stored in the image storage part. The input and output part correlates and sends memory card identification information for uniquely identifying a memory card within a network and image identification information for identifying image information with the image information to the information terminal.

In addition, a memory card is provided arranged with an image storage part for associating and storing image information taken by the imaging device with summary image information having a smaller amount of information than the image information, and an input and output part which performs input and output with an information terminal and performs input and output to and from the imaging terminal which can connect to a network. An example of the operations of the memory card is as follows. The input and output part receives image information and summary image information from the imaging terminal. The image storage part correlates and stores the image information and summary information with image identification information for identifying image information. The input and output part correlates and sends image information identification, memory card identification information for uniquely identifying the memory card within a network and image information of the external appearance of the memory card with the summary image information to the information terminal.

In an embodiment of the present invention, the user A can take images using a plurality of imaging terminals and manage in a unified manner all image information, which are distributed and stored in storage services connected via a network or in a plurality of memory cards, even in the case where the information terminal A does not store the real image information. The reason for this is that in an embodiment of the present invention, the correlation of the real image ID 1401 of all images to be managed of real images and the storage destination 1403 is stored in the image attribute table 104.

Next, the functions and effects related to the present invention are explained in detail using embodiment on described above. According to a information terminal, a memory card, an imaging terminal, a mobile terminal, a server, a method, and a system, the following effects can be obtained.

The first effect in according to an embodiment of the present invention is that it is possible to collectively manage the image information taken by a plurality of imaging terminals using the information terminal A. According to the conventional method, because images taken by different imaging terminals are stored in different memory cards, these images were difficult to manage collectively. Conversely, attempting to collectively manage images by copying images taken by the imaging terminal to an information terminal such as a personal computer made it difficult to manage which images were taken by which imaging terminal. According to an embodiment of the present invention, for example, a user A has a camera ID for uniquely identifying each imaging terminal among a plurality of imaging terminals, and these are stored in the image attribute table 104 of an information terminal A via a memory card (step S1005 and S1004). As is shown in FIG. 14, an image attribute table of the information terminal stores a correlation of each of real image IDs taken by the user A using a plurality of imaging terminals with camera IDs which is used to take the images. As a result, as is shown in FIG. 19, it is possible to display a list of images taken by a selected imaging terminal by the user A simply selecting (step S1012) the imaging device on the display part (step S1013). For example, it is possible to make both a request to collectively manage the still pictures taken with a still camera held by a user, images taken with a mobile phone, and video taken with a video camera, and a request to extract only pictures taken with the mobile phone with a single click.

The second effect according to an embodiment of the present invention is that it is possible for a user to collectively manage real images stored and distributed across a plurality of memory cards. According to an embodiment of the present invention, for example an user A has a card ID for uniquely identifying each of a plurality of memory cards, and these are stored in the image attribute table 104 of the information terminal (step S1004 and S1005). As is shown in FIG. 14, the image attribute table of an information terminal stores the correlation of a real image ID, an imaging terminal, and a memory card in which each real image is stored. As a result, as is shown in FIG. 17 and FIG. 18, the user A can display a list of images taken by the selected imaging terminal just by selecting (step S1010 and S1008) the memory card on the display means. In the conventional method, it was not easy for a user who uses a plurality of memory cards to manage which memory card required real image information is to be stored in. On the other hand, according to an embodiment of the present invention, because it is possible to browse summary images of images stored in each memory card with one click, it is possible to easily find the intended real image information.

The third effect according to an embodiment of the present invention is that a direct management is possible since it is possible to distinguish a plurality of memory cards or a plurality of imaging terminals using images representing each memory card or terminal when user A manages images using the information terminal A. According to the conventional method, in the case of a memory card, it was difficult to specify or estimate the content and imaging timing of an image stored just from an external appearance. Although there is a method for a user to attach a label to a memory card, mechanical problems are often caused when a user inserts a memory card into the slot of a information terminal or a camera which is not a method that is commonly used. According to the present invention, for example, image information representing the appearance of each of a plurality of memory cards held by the user A is stored as memory card additional information in a card ID storage means of the memory card. These are sent to the image attribute table 104 of the information terminal A (step S1005 and S1004), and stored in the card additional information table 105. Memory card additional information which is an image representing the external appearance of each memory card is displayed for example as image 1621 and image 1622 in FIG. 16 in the display part 107. Image 1621 and 1622 of the memory card additional information indicate the external appearance of the memory card M130 and the memory card N135 respectively. As a result, user A can directly understand what type of real image information is stored in the memory card M130 or the memory card N135 by comparing the summary image displayed on the summary image display part 1610 shown in FIG. 17 and FIG. 18 with the image 1621 and the image 1622. Similarly, in the present invention, image information representing the external appearance of each of a plurality of imaging terminals held by user A for example, is stored in the camera additional information table 109 of the information terminal A via a memory card. Camera additional information which is an image representing the external appearance of each imaging device is, for example, displayed as image 1631 and 1632 in FIG. 16 on the display part 107. The images 1631 and 1632 of the camera additional information indicate external appearances of the imaging terminal P140 and imaging terminal Q145. As a result, the user A can directly understand what type of imaging terminal each of real image information is taken by comparing the summary image displayed on the summary image display part 1610 shown in FIG. 19 with the image 1631.

The fourth effect according to an embodiment of the present invention is that it is possible to collectively use a memory card without being aware of the difference between a memory card and a storage service connected to a network. In the explanation of the present embodiment, an image selected in step S2002 is stored in the server of the storage service X via a network. At this time, in the image attribute table 104 of the information terminal A, as shown in FIG. 22, the ID of the storage service X in addition to the card ID is correlated and stored with a real image ID of the real image in the storage service X as a real storage destination. In this way, the user A can easily browse a list of images stored in the storage service X from the information terminal A. According to the present invention, a user can uniformly treat real images stored in an arbitrary server connected to information terminal A via a network in addition to a real image stored in a plurality of memory cards.

The fifth effect according to an embodiment of the present invention is that it is not necessary for a user A to store all real images. As described above, in an embodiment of the present invention, all real images taken by a plurality of imaging terminals and stored in a plurality of memory cards or a storage service via a network can be centrally managed with an information terminal A. According to the conventional method, in order to centrally manage image information using the information terminal A, it was necessary to store real image information of all real images in the information terminal A. In an embodiment of the present invention, as shown in FIG. 14, this effect arises because a correlation of a real image ID and a card ID that indicates the storage location or a storage service ID is stored in the image attribute table 104 of the information terminal A.

(Embodiment 2)

In the second embodiment of the present invention, the user A passes a memory card N to the user B and the user B attaches the memory card to the display terminal B. In this state, the user A can copy arbitrary real image information to the memory card N using the information terminal A. Then, the real image information is sent to the memory card N connected to the display terminal B via information terminal A100, the display terminal B150 and the network 199, and stored in the memory card N. The card ID of the memory card N is used as transfer destination information of image information during transfer of the real image information via the network.

Figure 27:
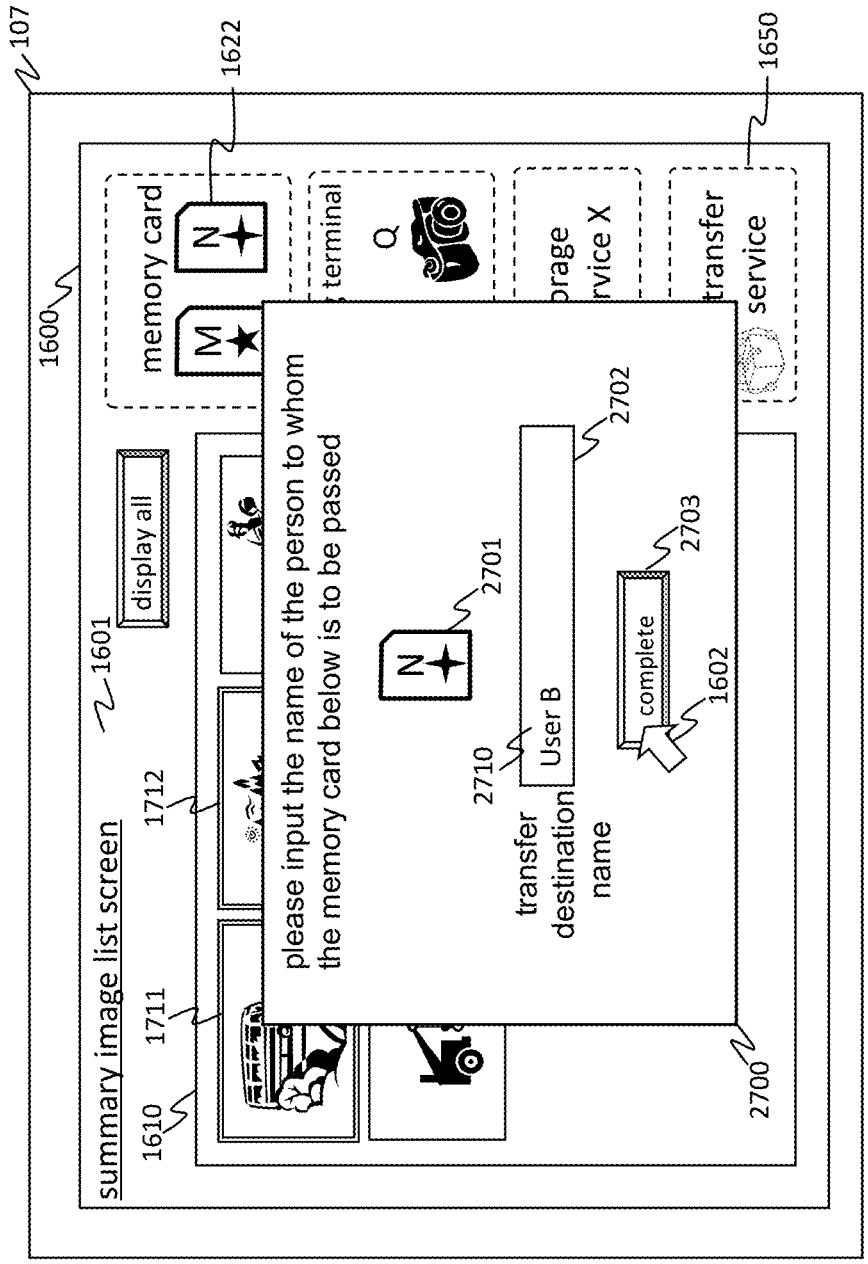
FIG. 27 is a diagram of one example of a transfer destination input screen related to an embodiment of the present invention.
Figure 28:
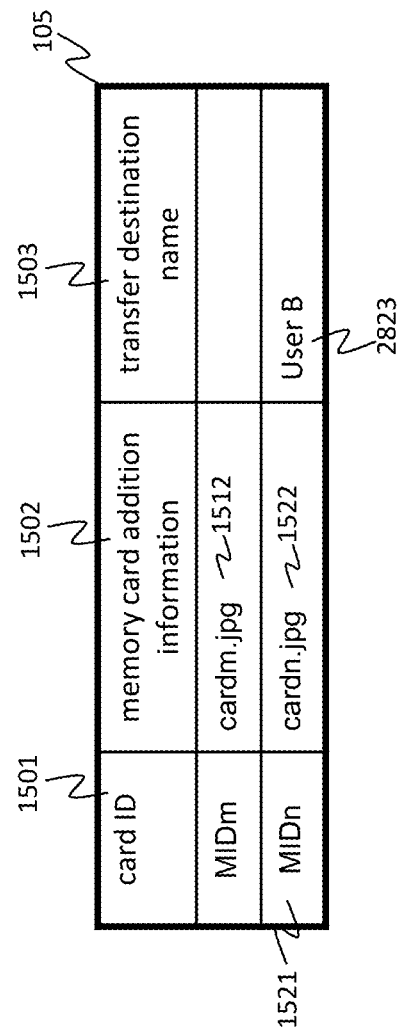
FIG. 28 is a diagram of one example of information stored by a card additional information table related to an embodiment of the present invention.

The second embodiment is explained using the flowchart shown in FIG. 20. The user A selects a transfer service display part 1650 in the summary image list screen shown in FIG. 16 with the memory card N135 attached to the information terminal A100 (step S2601). Then, a transfer destination input screen is displayed on the display part 107. An example of the transfer destination input screen is shown in FIG. 27. A window 2700 of the transfer destination entry screen includes image 2701 of the memory card N, a transfer destination name input section 2702 and a completion button 2703. An image 2701 of the memory card N is generated from the memory card additional information 1522 stored in the card additional information table 105. Here, the user A inputs the name of the user B (transfer destination name) 2710 who is a partner to pass the memory card N to, in the transfer destination name input section 2702 by operating the input means 106, and then selects the complete button 2703. The transfer destination name 2710 input by the user A at this time is stored in the transfer destination name column 1503 of the card additional information table 105 (step S2602). The card additional information table after step S2602 is executed is shown in FIG. 28. The name 2710 of the user B input in the transfer destination input screen is correlated and stored with the card ID1521 of the memory card N as a transfer destination name 2823 in the card additional information table.

Figure 29:
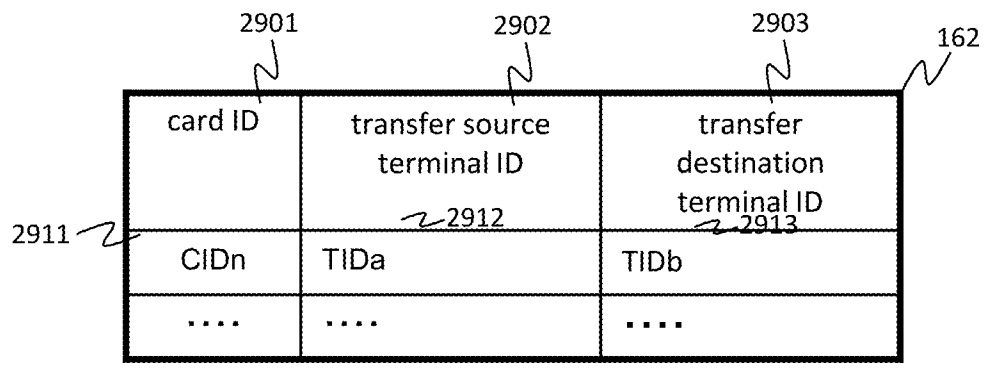

In addition, the network input and output means 101 of the information terminal A and sends the card ID1521 of the card additional information table to the server Y160 via the network 199. When the input and output means 161 of the server Y receives this, the card ID1521 is correlated and stored with the terminal ID for uniquely identifying the information terminal A within the network 199 in the card ID table 162 (step S2603). An example of a card ID table of the server Y is shown in FIG. 29. The card ID table 162 includes a card ID column 2901, a transfer source terminal ID column 2902, and a transfer destination terminal ID column 2903. Via step S2903, a card ID2911 received from the information terminal A100 is correlated and stored with TIDa2901 which is a terminal ID of the terminal information A obtained from a terminal ID management means 163. At the time of executing step S2603, the transfer destination ID2913 is not stored in the card ID table of server Y.

Figure 30:
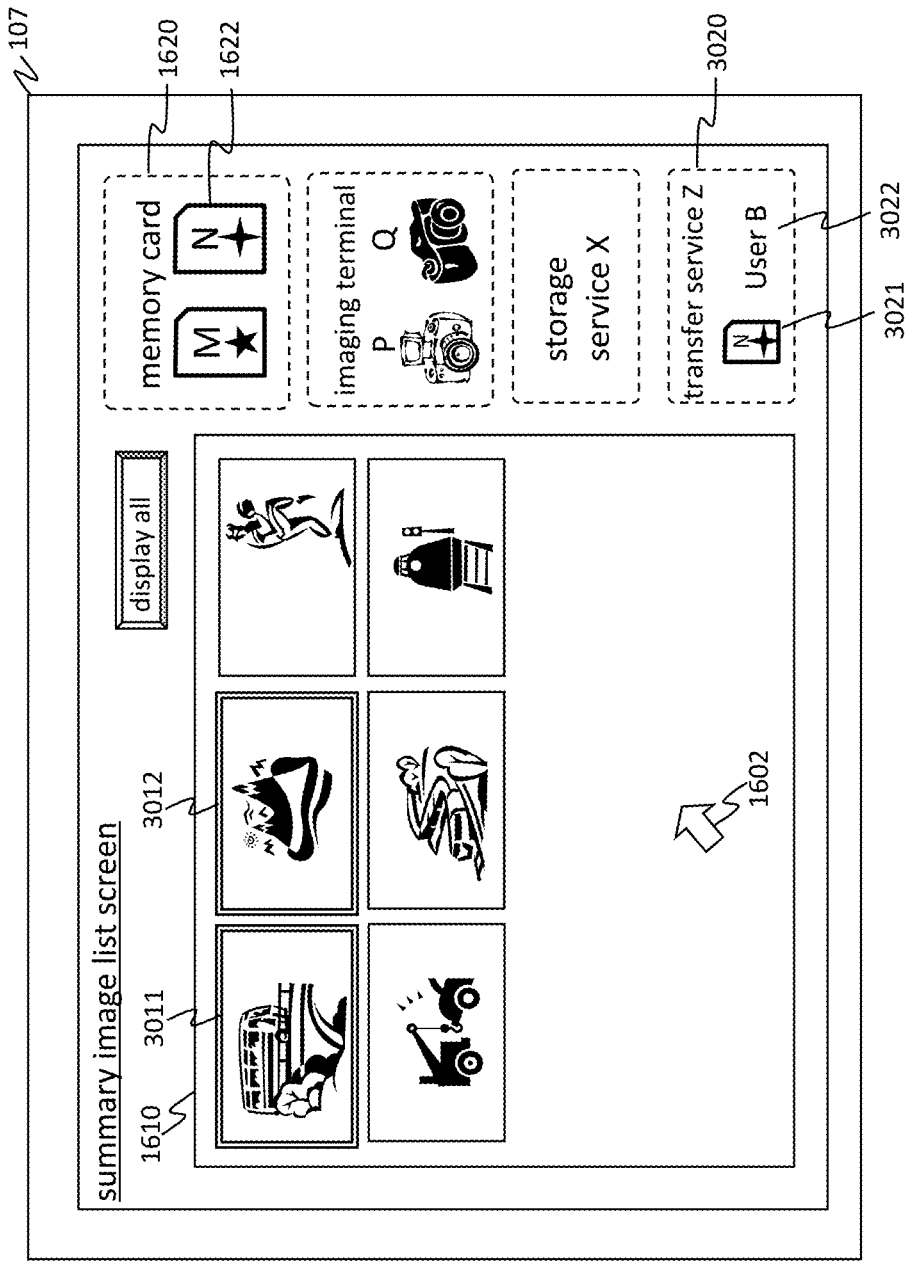
FIG. 30 is a diagram of one example of a summary image list screen related to an embodiment of the present invention.

In addition, after S2603 is executed, the display means 107 of the information terminal A displays is a summary image list screen. An example of the summary image list screen after step S2603 is shown in FIG. 30. The transfer destination name 3022 input by the user in step S2602 is displayed in the transfer service display part 3020. As in the example shown in FIG. 30, a memory card additional information display 3021 of the memory card N may also be included.

Next, the user A removes from the memory card N135 from the information terminal, and passes or sends the card to user B (step S2604). The user B, who receives the memory card N135, attaches the card to the display terminal B150. The card ID storage means 138 of the memory card N sends CIDn which is a card ID of the memory card N, to the display terminal B150 via the input and output means 136. In the display terminal B, after the memory card input and output means 152 receives this, the network input and output means 151 sends CIDn to the server Y160 via network 199. The input and output means 161 of the server Y receives CIDn which is a card ID of the memory card N from the display terminal B. Next, the search means of the server Y searches the card ID table 162 using the received CIDn as a search key. Again referring to FIG. 29, as a result the card IDn2911 is detected. Then, the card ID table correlates TIDb which is a terminal ID for uniquely identifying the display terminal B which is the sending source of CIDn in the network 199 acquired from the terminal ID management means 163, with CIDn2911, and stores in the transfer destination terminal ID column 2903 of the card ID table 162 (step S2605). TIDb2913 in FIG. 29 is stored in the card ID table 162 when step S2605 is executed and the card ID table 162 of the server Y becomes the state shown in FIG. 29.

Next, in a state where the summary image list screen shown in FIG. 30 is displayed, the user A operates the input means 106 the display part 107 of the information terminal A, moves the cursor 1602, and selects the summary image to be transferred to the user B (step S2606). FIG. 30 shows the state of the selected summary images 3011 and 3012 by the user A. In the example shown in FIG. 30, the double line around the summary image indicates that it is selected. Next, the user A moves the cursor 1602 by operating the input means 106, and selects the transfer destination name 3022 displayed in the display means 107 or the image 3021 of the memory card N (step S2607). This series of operations in step S2606 and 2607 are processes for transferring an arbitrary image to the user B who has memory card N at this time by the user A using a transfer service.

Next, the search means 110 of the information terminal A obtains from a search for real image information 1312 and 1322 which indicate the summary images selected in step S2606 from the image information table 103. In addition, the search means 110 obtains the card ID1521 correlated and stored in the card additional information table 105 which indicates the transfer destination name 3022 selected in step S2607. Next, the input and output means 101 of the information terminal A sends the real image information 1312 and 1322 obtained here and card ID1521 sent to the server Y via the network 199 (step S2608). When the input and output means 161 of the server Y receives this, the search means 164 searches the transfer destination terminal ID column 2903 of the card ID table 162 using the card ID1521 received from the information terminal A as a search key. Referring again to FIG. 29, the transfer destination terminal ID2913 correlated and stored with the card 2911 is obtained (step S2609). Next, sending and receiving means 161 of the server Y sends the real image information 1312 and 1322 sent from the information terminal A in step S2608 to the display terminal B150 via the network 199 with the transfer destination address ID2913 (step S2610).

The Network input and output means 151 of the display terminal B receives the real image information 1312 and 1322 from the server Y. Next, the memory card input and output means 152 sends this real image information to the attached memory card N135. When the input and output means 136 of the memory card N receives the real image information, it is stored in the image storage means 137. In addition, the display means 153 of the display terminal B displays the real image information 1312 and 1322 received from the server Y (step S2611).

As described above, the user A sends an image to the display terminal of the user B using the card ID of the memory card N stored in the information terminal of the user A and the display process is completed. Furthermore, in the explanation of the present embodiment, the information terminal A in step S2608 sends real image information taken in step S1001 in the explanation of the first embodiment to the display terminal B via the server Y. That is, in the present embodiment, before user A specifies the transfer destination in step S2602, the real image information stored in the information terminal A is sent to the information terminal B. However, in the present invention, after the transfer destination is specified by the user A, the user A takes a real image using an imaging terminal, and may send real image information stored in the image information table of the information terminal A via the memory card to the display terminal B via the process in step S2604 below. In this way, after user A has passed the memory card N once to the user B, the user B can obtain the real image information through the network 199 by the user A just operating the information terminal A.

As explained referring to Embodiment 1, in the present invention, it is possible to display a real image information list in the summary image display part in the summary image list screen displayed on the information terminal A, simply by selecting an arbitrary any memory card or arbitrary storage service. For example, FIG. 17 shows when the user A, who is in the state shown in FIG. 24, selects the display 1621 of the memory card M, as FIG. 18 shows the display 1622 of the memory card N is selected and as FIG. 24 shows the display 1640 of storage service X is selected. In addition, after the user A similarly selects an arbitrary summary image in the summary image list screen, when an arbitrary memory card or an arbitrary storage service to which a real image is copied is selected, the image is stored in the image information table 103. In this way, according to the present invention, the user A can uniformly browse and store real image information even in the state where a plurality of memory cards which store real image information exists or real information is also stored in the storage service on a network memory. In the present invention, this is for including a card ID for uniquely identifying each memory card on a network, and for making it possible to uniformly store storage destinations of real image information in the image additional information table 104 of the information terminal A.

In the second embodiment of the present invention, it is possible to remove a memory card and utilizes the property of the memory card that it can be attached to an information terminal of another user. In the second embodiment, the memory card N is passed to the user B from the user A, and while being attached to the display terminal B, the card ID management table 162 of the server Y correlates and stores the card ID2911 of the memory card N with the transfer destination ID2913 for uniquely identifying the display terminal of the user within the network. That is, in the second embodiment, in addition to the card ID explained in the first embodiment, it is possible for the user A to uniformly and easily send his/her own real image information to the user B using the ID for uniquely specifying a display terminal.

In the first embodiment, even when real image information is deleted from the image information table 103 of the information terminal A, the information terminal A stores a correlation of summary image information and a real image ID. Consequently, the information terminal A is able to prompt the user A to obtain a real image using the screen shown in FIG. 25. For example, in the second embodiment, in a state where the memory card N is attached to the display terminal B of the user B, the user A attempts to send real image information which is not stored in the information terminal A but is stored in the memory card M to the user B. In addition, in this case the real storage destination column 1403 of the image attribute table 104 using the selected real image ID as a search key. A attach request to the memory card is made to user A based on the card ID of the memory card M obtained as a result. In this way, it is possible to send real image information to the user B using the method of the present embodiment even if the real image information is stored in the information terminal A, arbitrary memory card or arbitrary storage service.

A system including a first information terminal, a second information terminal, and a server is provided as the second embodiment as described above. In this system, the first information terminal is arranged with an input and output part for inputting and outputting with an image storage device which stores image information taken by an imaging terminal, a storage part which correlates and stores image identification information for identifying image information, summary image information having less information than the image information, and device identification information for identifying an image storage device, a network input and output part for communicating with a server, and a display part. In addition, in this system, the second information terminal is arranged with an input and output part for inputting and outputting with an image storage device, and a network input and output part for communicating with a server. Furthermore, in this system, the server device is arranged with a network input and output part which communicates with the first information terminal and the second information terminal first respectively, and a storage part.

An example of the operation of this system is as follows. A display part of the first information terminal displays the device identification information. In addition, the display part of the first information terminal displays summary image information. Furthermore, the network input and output part of the first information terminal sends image information correlated with summary image information selected from the summary image information displayed on the display part of the first information terminal, and the displayed device identification information to the server. In addition, the network input and output part of the server receives the image information and device identification information from the first information terminal. The storage part of the server correlates and stores the image information received by the network input and output part of the server with the device identification information. In addition, input and output part of the second information terminal obtains the device identification information of the image storage device. The network input and output means of the second information terminal sends the device identification information obtained by the input and output part of the second information terminal. In addition, the network input and output part of the server receives the device identification information from the second information terminal and sends the image information correlated and stored with the received device identification information to the second information terminal. In addition, the network input and output part of the second information terminal receives the image information from the server. Furthermore, the input and output part of the second information terminal stores the image information received from the server in the image storage device.

In addition, a memory card is provided arranged with an image storage part for storing image information taken by an imaging terminal, and an input and output part which inputs and outputs with an imaging terminal and inputs and outputs with the first information terminal which can connect to a network and the second information terminal which can connect to a network. An example of the operation of the memory card is as follows. The input and output part receives first image information from an imaging terminal. The first image information is stored in the image storage part. The input and output part correlates memory card identification information for uniquely identifying the memory card in the network with image information of an external appearance of the memory card and sends to the first information terminal. The input and output part connected to the second information terminal sends the memory card identification information to the second information terminal. When the second image information and image information of the external appearance of the memory card and is selected on the display part of the first information terminal, the second image information is received via the network and second information terminal using memory card identification information as a key. The second image information received from the second information terminal is stored.

Next, the effects of the embodiments of the present invention are explained using the second embodiment in addition to the five effects explained in the first embodiment.

The sixth effect according to an embodiment of the present invention is that it is possible for a user A to show a photograph to a user B if the user A passes a memory card N once to the user B without the user A subsequently using the memory card N. In the conventional method, after the user A has copied a real image to the memory card N using the information terminal A and passed the card to user B, in the case where real image information is again copied to the memory card N from the information terminal A, it is necessary to obtain the memory card N from the user B, to copy additional real image information to the memory card N, and again to pass the memory card N to the user B. Therefore, it was necessary to physically exchange a memory card in order to exchange real image information between two parties using a memory card as the medium in the conventional method. In the method according to the present invention, after the user A copies the real image to the memory card N using the information terminal A and passes the card to the user B, it is possible to send the real image from the user A to the memory card held by the user B without having to physically exchange the memory card.

The seventh effect according to an embodiment of the present invention is that it is possible for a user A who manages real images and summary images on an information terminal using the present invention to realize transfer of real image information to other users or other terminals using a unified operation. Conventionally, in the case when the user A sends real image information via a network to a user B, there was a method of sending by attaching to an e-mail, or a method of uploading to a storage service or method and notifying the user B of a URL specifying the uploaded image. In this case, firstly, it was necessary for user A to determine in which memory card, which information terminal, or which storage service an image to be sent to user B is stored. Furthermore, it was necessary to input a mail address and send an e-mail to user B or notify user B of the upload destination after obtaining the URL. According to the present invention, it is possible for the user A to send a real image to the display terminal of the user B by using the same operation for copying real image information to the user A's own memory card or a storage service used by user A. In this way, it has become easier to send photographs to a family or friend who has a photo frame product, a TV, camera, a computer, or a mobile phone that can be connected to a network by providing a memory card slot. In addition, in the method of the present invention, real image information may also be sent to a photo frame product, a television, a camera, a computer, or a mobile phone held by the user A which can be connected to a network by providing a memory card slot. For example, real image information taken by multiple cameras may be managed using a plurality of memory cards or storage services on a computer corresponding to the information terminal A, and a part of this may be browsed on a digital photo frame product, a TV, camera, a computer, or a mobile phone held by the user A.

(Embodiment 3)

In the first embodiment of the present invention, the processes shown in the flowchart in FIG. 10 is executed using real image information and summary image information stored in the image information table 103, and a real storage destination stored in the image attribute table 104. In the third embodiment of the present invention explained below, a correlation between real image information, summary image information, and real storage destination is stored in the server Z180 of an image management service. In this way, the user A can take a plurality of images using a plurality of imaging terminals and collectively execute image management the same as in the first embodiment of all images storing real image information in a plurality of memory cards or storage services through the web browser of the mobile terminal 170.

Figure 31:
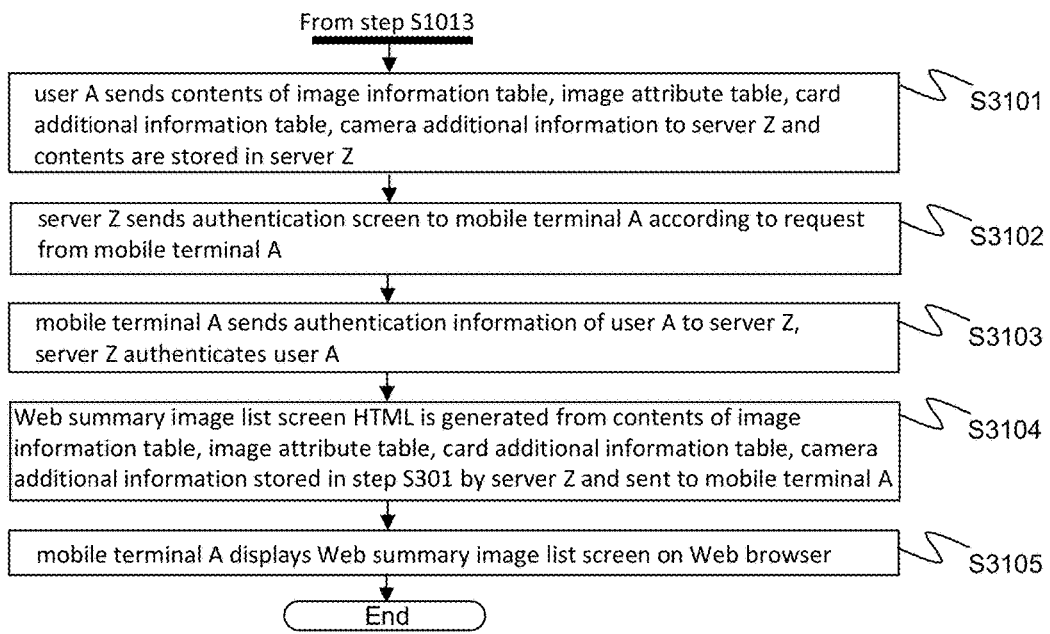
FIG. 31 is a flowchart of processes related to an embodiment of the present invention.

The third embodiment of the present invention is explained using the flowchart shown in FIG. 31. The third embodiment is executed continuing from step S1013. First, the network input and output means 101 of the information terminal A sends a real image ID column 1301, a summary image ID column 1303, and a summary image information column 1304 of the image information table 103 to the server Z180 via the network 199. When input and output means 181 of the server S receives these, they are stored in the summary image information table 187. The summary image information table 187 of the server Z is the same as the image information table 103 of the information terminal A but does not include the real image information column 1302. Similarly, network input and output part 101 of the information terminal A sends all of the information of the image attribute table 104 to the server Z180 via the network 199. When the input and output means 181 of the server Z receives these, they are stored in the image attribute table 188. Furthermore, similarly the entire contents of the card additional information table 105 of the information terminal A is copied to the card additional information table 189 of the server Z, or the entire information of the camera additional information table 109 of the information terminal A is copied to the card additional information table 190 of the server Z (step S3101).

Next, when the user A operates the input means of the mobile terminal A 170, the network input and output means 171 sends an authentication request screen of the image management service Z through the 199 network to the server Z 180. When the input and output means 181 of the server Z receives this, the HTML generation means 182 generates an HTML code for drawing an authentication screen of the image management service Z, and the input and output means 181 sends the code to the mobile terminal A170 through the network 199 (step S3102). When the network input and output part 171 of the mobile terminal A receives this code, the HTML analysis part 173 analyzes the result, and the display means 174 displays the authentication screen of the image management service Z. Here, the authentication screen is comprised from a user ID input field and a password input field for the image management service Z. However, any information input screen means may be used as long as user A can be authenticated. Next, user A operates the input means 172 and inputs a user ID and a password of the user A in the image management service Z, and the network sending and receiving means 171 sends this information to the server Z180 through the network 199. When the input and output means 181 of the server Z receives this information, the user A is confirmed by the authentication means when a confirmation or a match of the user ID and password of the user A stored the user information table 18 is detected (step S3103).

Next, the HTML generation means 182 of the server Z reads the summary image stored in the summary image information table 187, the memory card additional information stored in the card additional information table 189 and the camera additional information stored in the camera additional information table 190 and generates an HTML code necessary to generate a Web summary image list screen. Next, the input and output means 181 sends the HTML code to the mobile terminal 170 via a network (step S3104). When the network input and output means 171 of the mobile terminal receives this HTML code, the code is analyzed by the HTML analysis means 173 and the display means 174 displays the Web summary image list screen (step S3105).

An example of a Web summary list screen image is shown in FIG. 32. The display means 174 of the mobile terminal A includes a Web browser window 3200 and a cursor 3202. The Web browser window 3200 includes a display 3201 which shows that this is a Web summary image list screen, a summary image display part 3210, a memory card display part 3220, an imaging terminal display part 3230, a storage service X display part 3240, an information terminal A display part 3250, and all display buttons 3260. In the example shown in FIG. 32, the summary images 3211 to 3216 are displayed on the summary image display part 3210. These summary images show that the summary images stored in the summary image information table 187 of the server Z are sent via the network 199 to the mobile terminal A170 as an HTML code. The memory card image 3221 of the memory card M and the memory card image 3221 of the memory card N are displayed in the memory card display part 3220. These images show that the memory card additional information stored in the card additional information table 189 is displayed by the display part 174. In addition, the image 3231 of the imaging terminal P and the image 3232 of the imaging terminal Q are displayed in the imaging terminal display part 3230. These images show that the camera additional information stored in the card additional information table 190 of the server Z is displayed by the display part 174. The Web summary image list screen shown as an example in FIG. 32 is similar to the summary image list screen shown in FIG. 16. FIG. 16 of the first embodiment explained that information stored in the image information table 103, the image attribute table 104, the card additional information table 105, and the camera additional information table 109 of the information terminal A is displayed on the display part of the information terminal A. FIG. 32 of the third embodiment shows that information stored in the summary image information table 187 of the server Z, the image attribute table 188, the card additional information table 189, and the camera additional information table 190 is obtained by the mobile terminal A via the network 199 as an HTML code and displayed by the display means 174. In the example shown in FIG. 32, the display within the Web browser window 3200 is set to be the same as that shown in FIG. 16. However, as long as a summary image display part 3210 is included, other screen elements other may be included or omitted.

In this state, the user A can display on the summary image display part 3210 the same as in the first embodiment, a summary image list of images in which real image information is stored by selecting each part of a memory card N 3221, a memory card M 3222, an imaging terminal P 3231, an imaging device Q 3232, and a storage service X 3240. Because this operation by the user A is the same as in step S1013 or step S1008 shown in FIG. 10, an explanation is omitted here. In addition, the user A operates the input part 172 of the mobile terminal A, moves the cursor 3202, and when user A selects the display part 3250 of the information terminal A in FIG. 32, among the summary images stored in the summary image information table 187 of the server Z, only a summary image for which a real image is stored in the image information table 103 of the information terminal A is selectively displayed on the Web browser 3200. Furthermore, copying real image information between the information terminal A, the memory card M, the memory card N, and server X can also be executed by a Web browser window of the mobile terminal A using the same method as explained in the first embodiment.

As described above, in the present embodiment, a system is provided including an information terminal, a mobile information terminal, a first server, and a second server. In this system, an information terminal is arranged with a first input and output part which inputs and outputs with an image storage device which stores image information taken by an imaging terminal, a storage part which correlates and stores image identification information for identifying image information, summary image information with a smaller amount of information than image information, and device identification information for identifying the image storage device, and a network sending and receiving part for communicating with the server. In addition, in this system, the first server and the second server are arranged with a network sending and receiving part for communicating with the information terminal and the mobile information terminal, and a storage part respectively.

An example of the operation of this system is as follows. The network input and output means sends image identification information, summary image information, and device identification information stored in the storage part of an information terminal, and the network input and output part of the first server receives the image identification information, the summary image information, and the device identification information from the information terminal. The storage part of the first server stores the image identification information, the summary image information, and the device identification information received by the network input and output part of the server. The network input and output part of the information terminal sends the image information and the image identification information stored in the image storage device. The network input and output part of the second server receives the image information and image identification information from the information terminal. The storage part of the second server stores the image information and image identification information received by the network input and output part of the second server. The network input and output part of the first server receives the device identification information sent from the mobile terminal. The network input and output part of the first server sends the summary image information and image identification information correlated and stored with the received device identification information to the mobile terminal. The network input and output part of the second server receives the image identification information sent from the mobile terminal, and the network input and output part of the second server sends the image information correlated and stored with the received image identification information to the mobile terminal.

In addition, in the present embodiment, a server is provided arranged with a first information terminal and second information terminal which include an input and output part for inputting and outputting with an image storage device which stores image information taken by an imaging terminal, a network input and output part for connecting via a network, and a storage part which correlates and stores image identification information for identifying image information, summary image information with a smaller amount of information than the image information, and device identification information for identifying an image storage device. An example of the operation of the server is as follows. Network input and output part receives image identification information, summary image information and device identification information from the first information terminal. The storage part correlates and stores the image identification information, summary image information, and device identification information. The summary image information and image identification information are sent to the second information terminal. The summary image information and image identification information selected by the second information terminal is received. The device identification information correlated and stored with the image identification information is sent to the first information terminal. The image information is received via the first information terminal from the image storage device and is sent to the second information terminal.

Next, the effects of the present invention obtained by using the third embodiment are explained in addition to the seven effects explained in the first and second embodiments.

The eight effect according to an embodiment of the present invention is that it is possible to perform the same operations as the first embodiment and second embodiment via a Web browser by associating a summary image and real storage destination with each real image ID and storing in the server Z in advance regardless of the storage destination of the real image. In particular, the capacity of the storage part of a mobile terminal it is often small in comparison with a server or stationary type information terminal. In the conventional method, in order to carry out the processes in the mobile terminal using the same method as in the first embodiment and the second embodiment, it is necessary to take images using a plurality of imaging terminals, and to store all the real image information stored in a plurality of memory cards or storage services in the storage means of the mobile terminal, which in most cases is not practical. In the present invention, it is possible to realize the same operations as in the first and the second embodiments with respect to taking images using a plurality of imaging terminals and all of the real image information stored in a plurality of memory cards or storage services can be accessed using a Web browser without storing the real image information in a mobile terminal.

The ninth effect of an embodiment according to the present invention is that it is possible to conserve storage capacity of the server Z since the real mage information is not stored in the summary image information table 187 of the server Z. In the conventional method, a summary display list screen is generated from the mobile terminal A by storing all real images in a Web server. However, in this method, because all real image information is stored in the storage of a Web server, storage capacity and costs are increased. On the other hand, in the method according to the present invention, because the server Z stores summary image information but does not store real image information, storage capacity required by the server Z is greatly reduced compared to conventional methods. It is possible to realize the same operations as in the first and second embodiments with respect to taking real image IDs and summary image information using a plurality of imaging terminals and all of the real image information stored in a plurality of memory cards or storage services.

According to the present invention, it is possible to maintain and manage a large amount of image information taken by one user using a plurality of imaging terminals and distributed and stored across a plurality of memory cards, information terminals, and servers using an information terminal and a Web browser in a unified manner, send arbitrary images easily to another person and browse the image on a display terminal.

What is claimed is:

1. An image management device comprising:
   a storage part configured to store an identification information and an image information, the identification information identifying an external device connectable to a first information terminal from another external device, the storage part being configured to correlate the identification information with the image information;
   a communication part;
   a first receiving control part configured to control the communication part so as to receive the identification information from a second information terminal, the second information terminal being different from the first information terminal and connected with the external device; and
   a transmitting control part configured to control the communication part so as to read the image information from the storage part and transmit the image information to the second information terminal, the image information being correlated with the identification information received by the first receiving control part.

2. The image management device according to claim 1, wherein
   the storage part further includes a judgement part, the judgement part storing transfer destination information of the image information in association with the identification information and judging whether or not the second information terminal is managed by the transfer destination information stored in the storage part, and
   when the judgement part judges that the second information terminal is managed by the transfer destination information, the transmission control part controls the communication part to transmit the image information to the second information terminal.

3. The image management device according to claim 1, further comprising a second receiving control part being configured to control the communication part so as to receive the identification information and the image information from the first information terminal,
   wherein the storage part stores the identification information received by the second receiving control part and an image information.

4. The image management device according to claim 1, wherein the external device includes a memory card connectable to the first information terminal and the second information terminal.

5. A method for managing an image by a server having a storage part and a communication part, the storage part being configured to store an identification information and an image information, the identification information identifying an external device connectable to a first information terminal from another external device, the storage part being configured to correlate the identification information with the image information, the method comprising:
   controlling the communication part so as to receive the identification information from a second information terminal, the second information terminal being different from the first information terminal and connected with the external device; and
   controlling the communication part so as to read the image information from the storage part and transmit the image information to the second information terminal, the image information being correlated with the identification information received from the second information terminal.

* * * * *